US010557727B2

(12) United States Patent
Maniouloux et al.

(10) Patent No.: US 10,557,727 B2
(45) Date of Patent: Feb. 11, 2020

(54) INDUCTIVE DISPLACEMENT SENSORS

(71) Applicant: HUTCHINSON, Paris (FR)

(72) Inventors: Yohan Maniouloux, Angers (FR); Gor Lebedev, Grenoble (FR)

(73) Assignee: HUTCHINSON, Paris (FR)

( * ) Notice: Subject to any disclaimer, the term of this patent is extended or adjusted under 35 U.S.C. 154(b) by 247 days.

(21) Appl. No.: 15/542,470

(22) PCT Filed: Jan. 13, 2016

(86) PCT No.: PCT/FR2016/050054
§ 371 (c)(1),
(2) Date: Jul. 10, 2017

(87) PCT Pub. No.: WO2016/113500
PCT Pub. Date: Jul. 21, 2016

(65) Prior Publication Data
US 2018/0274948 A1 Sep. 27, 2018

(30) Foreign Application Priority Data

Jan. 13, 2015 (FR) ...................... 15 50231

(51) Int. Cl.
G01D 5/20 (2006.01)
G01B 7/00 (2006.01)
(Continued)

(52) U.S. Cl.
CPC ........... *G01D 5/2053* (2013.01); *G01B 7/003* (2013.01); *G01D 5/2046* (2013.01); *G01P 3/49* (2013.01); *G01P 3/505* (2013.01)

(58) Field of Classification Search
None
See application file for complete search history.

(56) References Cited

U.S. PATENT DOCUMENTS 3,491,289 A 1/1970 Petrini
4,417,208 A 11/1983 Hachtel et al.
(Continued)

FOREIGN PATENT DOCUMENTS

DE 3014137 A1 10/1981
DE 3828456 A1 3/1990
(Continued)

OTHER PUBLICATIONS

International Search Report issued in Application No. PCT/FR2016/050052, dated Mar. 30, 2016.
(Continued)

*Primary Examiner* — Nasima Monsur
(74) *Attorney, Agent, or Firm* — Young & Thompson

(57) ABSTRACT

A target for an inductive displacement sensor is provided, including a plurality of conductive patterns distributed along a zone having a dimension $D_{tot}$ in a direction, the patterns being defined by the overlay of at least a first set of elementary periodic patterns having a period approximately equal to $D_{tot}/N$, including N first elementary conductive patterns of a dimension approximately equal to $D_{tot}/2N$ in the direction, regularly distributed along the zone, and of a second set of elementary periodic patterns having a period approximately equal to $D_{tot}/(N+r)$, including N+r second elementary patterns of a dimension approximately equal to $D_{tot}/2(N+r)$ in the direction, regularly distributed along the zone, where N is an integer greater than or equal to 2 and r is a positive integer, different to zero and less than or equal to N−1, wherein first and second elementary conductive patterns overlap at least partially.

16 Claims, 10 Drawing Sheets

(51) Int. Cl.
*G01P 3/49* (2006.01)
*G01P 3/50* (2006.01)

(56) References Cited

U.S. PATENT DOCUMENTS

| | | | |
|---|---|---|---|
| 4,820,961 A * | 4/1989 | McMullin | G01D 5/2053 180/167 |
| 5,804,963 A | 9/1998 | Meyer | |
| 6,011,389 A * | 1/2000 | Masreliez | G01D 5/2046 324/207.17 |
| 6,054,851 A * | 4/2000 | Masreliez | G01D 5/2053 324/207.17 |
| 6,124,708 A * | 9/2000 | Dames | G01D 5/2053 324/207.12 |
| 6,175,232 B1 | 1/2001 | De Coulon et al. | |
| 6,329,813 B1 | 12/2001 | Andermo | |
| 6,522,128 B1 | 2/2003 | Ely et al. | |
| 6,605,939 B1 | 8/2003 | Jansseune et al. | |
| 6,646,433 B2 | 11/2003 | Milvich | |
| 6,688,878 B1 | 2/2004 | Rogelet | |
| 7,276,897 B2 | 10/2007 | Lee | |
| 7,538,544 B2 | 5/2009 | Lee | |
| 7,576,533 B2 | 8/2009 | Back et al. | |
| 7,589,526 B2 | 9/2009 | Goldfine et al. | |
| 7,821,256 B2 | 10/2010 | Lee | |
| 7,908,111 B2 | 3/2011 | Lenglet | |
| 8,729,887 B2 | 5/2014 | Suzuki et al. | |
| 2008/0018328 A1 | 1/2008 | Meyer | |
| 2008/0122640 A1 | 5/2008 | Burwell et al. | |
| 2008/0284554 A1 | 11/2008 | Schroeder et al. | |
| 2010/0277161 A1 * | 11/2010 | Steinke | G01D 5/24476 324/207.24 |
| 2012/0223701 A1 | 9/2012 | Vaysse et al. | |
| 2012/0274185 A1 | 11/2012 | Kanemitsu et al. | |
| 2014/0125327 A1 | 5/2014 | Lackey | |
| 2014/0167788 A1 | 6/2014 | Fontanet | |
| 2014/0225600 A1 | 8/2014 | Fontanet et al. | |

FOREIGN PATENT DOCUMENTS

| | | | |
|---|---|---|---|
| EP | 0182085 | A2 | 5/1986 |
| EP | 0212406 | A2 | 3/1987 |
| EP | 0289033 | A2 | 11/1988 |
| EP | 0455613 | A2 | 11/1991 |
| EP | 0743508 | A2 | 11/1996 |
| EP | 0785415 | A1 | 7/1997 |
| EP | 0933617 | A1 | 8/1999 |
| EP | 1881299 | A2 | 1/2008 |
| FR | 2891362 | A1 | 3/2007 |
| FR | 2914126 | A1 | 9/2008 |
| FR | 2964735 | A1 | 3/2012 |
| FR | 3000198 | A1 | 6/2014 |
| WO | 2006/064236 | A1 | 6/2006 |
| WO | 2006/079793 | A1 | 8/2006 |

OTHER PUBLICATIONS

International Search Report issued in Application No. PCT/FR2016/050053, dated Mar. 23, 2016.
International Search Report issued in Application No. PCT/FR2016/050054, dated Mar. 30, 2016.
International Search Report issued in Application No. PCT/FR2016/050055, dated Apr. 8, 2016.
French Search Report issued in Application No. FR 1550232, dated Jul. 8, 2015.
French Search Report issued in Application No. FR 1550229, dated Nov. 11, 2015.
French Search Report issued in Application No. FR 1550230, dated Nov. 18, 2015.
French Search Report issued in Application No. FR 1550231, dated Nov. 19, 2015.
Notice of References Cited in co-pending U.S. Appl. No. 15/542,462 dated May 1, 2019.
Office Action in co-pending U.S. Appl. No. 15/542,462 dated May 1, 2019.
Notice of References Cited in co-pending U.S. Appl. No. 15/542,468 dated May 2, 2019.
Office Action in co-pending U.S. Appl. No. 15/542,468 dated May 2, 2019.
Notice of References Cited in co-pending U.S. Appl. No. 15/542,474 dated Apr. 26, 2019.
Office Action in co-pending U.S. Appl. No. 15/542,474 dated Apr. 26, 2019.
Notice of References Cited in co-pending U.S. Appl. No. 15/542,474 dated Jul. 10, 2019.

* cited by examiner

INDUCTIVE DISPLACEMENT SENSORS

FIELD

The present application relates to the field of inductive measurement of displacement of one mechanical part with respect to another. The term inductive measurement denotes herein the measurement of alternating electromagnetic fields, by means of electrical coils. More specifically but not restrictively, the present application relates to the technical sub-field of eddy-current sensors, wherein an electromagnetic field generated by an inductor is established differently according to the presence and the arrangement of movable (with respect to the inductor) conductive parts in the vicinity of the inductor. Such electromagnetic phenomena become exploitable for instrumentation purposes when certain electrical frequencies of the electromagnetic field adopt sufficiently large values, this concept of largeness being determined by a plurality of parameters such as the geometric dimensions of the conductive parts, the electrical and magnetic properties thereof, the temperature thereof, etc. The term displacement measurement denotes herein the estimation of information relating to the position, speed, acceleration or any other characteristic quantity of the displacements of the conductive part with respect to the inductor or to the inductor reference frame. As displacements, equally well angular (rotation about an axis), linear (translation along an axis) displacements, or any combination of such displacements with one another or along separate axes are taken into consideration. More particularly but not restrictively, the present application relates to the technical sub-fields of inductive position sensors, inductive speed sensors and/or inductive acceleration sensors.

DESCRIPTION OF THE PRIOR ART

An inductive displacement sensor typically comprises a transducer (for example rigidly connected to a measurement reference frame, also known as a frame), and a target (for example rigidly connected to a movable mechanical part with respect to the measurement reference frame). The target is placed away from the transducer, and is not in contact (either mechanically or electrically) with the transducer (contactless measurement). The transducer includes a primary winding, or inductor, suitable for producing an alternating electromagnetic field, and at least one secondary winding at the terminals whereof an alternating voltage is induced, also referred to as electromotive force or EMF, in the presence of the electromagnetic field produced by the primary winding. The target is a partially or fully conductive element, also referred to as a coupling armature, the presence and/or movement whereof in front of the transducer modifies the coupling between the primary winding and the secondary winding. It should be noted that the effect of the target on the coupling between the primary winding and the secondary winding is dependent on the position of the target with respect to the transducer, but also on the speed thereof with respect to the transducer.

The electromagnetic field distribution is thus formed spatially according to the position and the relative displacement of the target with respect to the transducer. During a displacement of the mechanical part, the spatial distribution of the electromagnetic field changes, and therefore the EMF induced in the secondary winding also changes. The analysis of the EMF induced, at the terminals of the secondary winding, by the electromagnetic field produced by the primary winding, makes it possible to estimate the position and/or the displacement of the target with respect to the secondary winding of the transducer. More particularly but not restrictively, the temporal variations of the EMF amplitude at the terminals of the secondary winding make it possible to estimate the position, speed and/or acceleration of the target with respect to the transducer.

It is specified that, herein and hereinafter in the present application, the term electromotive force range amplitude at the terminals of the secondary winding refers to the instantaneous value adopted by a limited frequency content signal, for example in a frequency band between $-\Delta f$ and $+\Delta f$ about the excitation frequency (i.e. the frequency of the alternating voltage applied at the terminals of the primary winding), where $\Delta f$ could for example adopt a value between 100 Hz and 100 kHz, carrying the information or a part of the characteristic information of the mechanical displacement. This signal is contained in the electromotive force, modulated at the excitation frequency and/or the harmonics thereof. It can be obtained by means of a frequency transposition and filtering method, and more specifically by means of base band transposition and filtering. A preferred example of such a method consists of carrying out synchronous demodulation of the (modulated) electromotive force using a synchronous excitation frequency signal, and wherein the electrical phase has been chosen to meet specific criteria, for example to maximize the signal obtained at the demodulation output. An alternative method consists of computing the modulus of the signal after synchronous demodulation, which involves the advantage and disadvantage of not setting an electrical demodulation phase. It is also specified that the amplitude of the electromagnetic force is a preferred measurement quantity for the implementation of a displacement measurement with the sensors according to the invention, but that it is in no way exclusive from further electrical measurement quantities such as the phase, frequency, or the electrical power at the secondary winding when a load of finite value is connected to the terminals of the secondary winding (load adaptation).

Examples of inductive displacement sensors, and more particularly of eddy-current position sensors have been described in the patent EP0182085.

However, known inductive displacement sensors involve various drawbacks. In particular, known sensors are relatively sensitive to assembly inaccuracies (misalignment, inclination and/or target/transducer distance), as well as the presence of conductive parts in the vicinity of the measurement zone, which poses problems for industrial use. Problems associated with the lack of linearity of the sensor response may also arise. Furthermore, the precision and robustness of the estimation of the position and/or displacement of the target in known sensors would merit being improved. Moreover, it would be desirable to be able to increase the extent of the measurement range of some types of known sensors. In addition, one drawback of known sensors is that they are relatively fragile, which poses problems in some types of application, particularly in an industrial environment.

It would be desirable to be able to have inductive displacement sensors remedying all or some of the drawbacks of known sensors.

SUMMARY

As such, one embodiment envisages a target for an inductive displacement sensor, comprising a plurality of conductive patterns distributed along a zone having a dimension $D_{tot}$ in a direction, said patterns being defined by the overlay of at least a first set of elementary periodic patterns having a period approximately equal to $D_{tot}/N$, including N first elementary conductive patterns of a dimension approximately equal to $D_{tot}/2N$ in said direction, regularly distributed along said zone, and of a second set of elementary periodic patterns having a period approximately equal to $D_{tot}/(N+r)$, including N+r second elementary patterns of a dimension approximately equal to $D_{tot}/2(N+r)$ in said direction, regularly distributed along said zone, where N is an integer greater than or equal to 2 and r is a positive integer, different to zero and less than or equal to N−1, wherein first and second elementary conductive patterns overlap at least partially.

According to one embodiment, the first and second elementary conductive patterns have respectively the shape of portions of overlaid first and second strips parallel with said direction.

According to one embodiment, the first and second strips are of approximately identical widths.

According to one embodiment, the first and second strips are of separate widths, the first strip being at least two times wider than the second strip.

According to one embodiment, N is an even number.

According to one embodiment, said patterns are defined by the overlay of the first and second sets of periodic elementary patterns, and of a third set of periodic elementary patterns having a period approximately equal to $D_{tot}/(N+r)$, comprising N+r third elementary patterns of a dimension approximately equal to $D_{tot}/2(N+r)$ in said direction, regularly distributed along said zone with an offset of approximately $D_{tot}/2(N+r)$ with respect to the elementary patterns of the second set of periodic patterns, first and third elementary conductive patterns overlapping at least partially.

According to one embodiment, the first, second and third elementary patterns have respectively the shape of portions of first, second and third strips parallel with said direction, the first and second strips, on one hand, and the first and third strips, on the other, being overlaid, and the second and third strips being approximately of the same width less than the width of the first strip.

According to one embodiment, the direction is a circular direction.

According to one embodiment, the dimension $D_{tot}$ is an angular dimension equal to 360°.

According to one embodiment, r is equal to 1.

A further embodiment envisages a transducer for an inductive displacement sensor, comprising: a primary winding; a first set of at least two secondary windings each comprising N first turns of the same winding direction or 2N first turns of alternating winding directions, regularly distributed along a zone having a dimension $D_{tot}$ in a direction, each first turn having a dimension in said direction approximately equal to $D_{tot}/2N$; and a second set of at least two secondary windings each comprising N+r second turns of the same winding direction or 2(N+r) second turns of alternating winding directions, regularly distributed along said zone, each second turn having a dimension in said direction approximately equal to $D_{tot}/2(N+r)$, where N is an integer greater than or equal to 2 and r is a positive integer, different to zero and less than or equal to N−1, wherein first and second turns overlap at least partially.

According to one embodiment, the first and second turns have respectively the shape of portions of overlaid first and second strips parallel with said direction.

According to one embodiment, the transducer further comprises a third set of at least two secondary windings each comprising N+r third turns of the same winding directions or 2(N+r) turns of alternating winding directions, regularly distributed along said zone with an offset of approximately $D_{tot}/2(N+r)$ with respect to the second set, each third turn having a dimension approximately equal to $D_{tot}/2(N+r)$ in said direction, and first and second turns overlapping at least partially.

According to one embodiment, the first, second and third turns have respectively the shape of portions of first, second and third strips parallel with said direction, the first and second strips being overlaid and the first and third strips being overlaid.

According to one embodiment, the second and third secondary windings are connected in series.

According to one embodiment, the serial connection point of the second and third secondary windings is connected to an electrical connection terminal.

A further embodiment envisages an inductive displacement sensor, comprising a transducer of the type mentioned above, and a target of the type mentioned above.

BRIEF DESCRIPTION OF THE DRAWINGS

These features and advantages, along with others, will be described in detail in the following description of particular embodiments given non-restrictively with reference to the attached figures wherein.

DETAILED DESCRIPTION

Figures 1A, 1B:
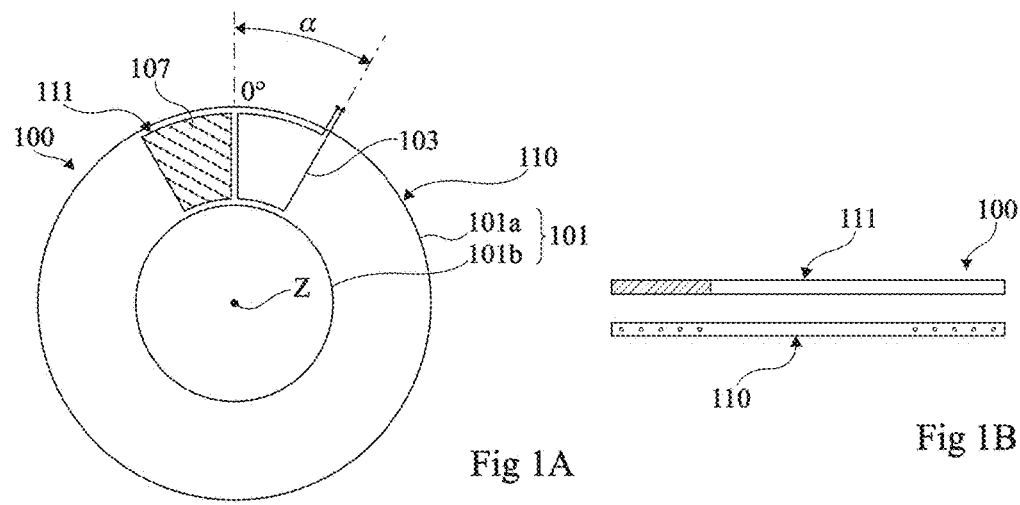
FIGS. 1A and 1B are respectively a front view and a profile view schematically representing an example of an inductive angular displacement sensor.

For the purposes of clarity, the same elements have been denoted with the same references in the various figures and, furthermore, the various figures are not plotted to scale. Moreover, hereinafter in the description, unless specified otherwise, the terms "approximately", "substantially", "around", "of the order of", "practically", etc., mean "within 20% and preferably within 5%", or "within 5° and preferably within 2°" when they relate to angular distances, and directional references such as "vertical", "horizontal", "lateral", "below", "above", "top", "bottom", etc., apply to device oriented in the manner illustrated in the corresponding views, it being understood that, in practice, these devices may be oriented differently.

Particular focus is placed on the inductive measurement of displacement of one mechanical part with respect to another. The term inductive measurement denotes herein the measurement of alternating electromagnetic fields, by means of electrical coils. More specifically but not restrictively, the present application relates to the technical sub-field of eddy-current sensors, wherein an electromagnetic field generated by an inductor is established differently according to the presence and the arrangement of movable (with respect to the inductor) conductive parts in the vicinity of the inductor. Such electromagnetic phenomena become exploitable for instrumentation purposes when certain electrical frequencies of the electromagnetic field adopt sufficiently large values, this concept of largeness being determined by a plurality of parameters such as the geometric dimensions of the conductive parts, the electrical and magnetic properties thereof, the temperature thereof, etc. The term displacement measurement denotes herein the estimation of information relating to the position, speed, acceleration or any other characteristic quantity of the displacements of the conductive part with respect to the inductor or to the inductor reference frame. As displacements, equally well angular (rotation about an axis), linear (translation along an axis) displacements, or any combination of such displacements with one another or along separate axes are taken into consideration. More particularly but not restrictively, the present application relates to the technical sub-fields of inductive position sensors, inductive speed sensors and/or inductive acceleration sensors.

An inductive displacement sensor typically comprises a transducer (for example rigidly connected to a measurement reference frame, also known as a frame), and a target (for example rigidly connected to a movable mechanical part with respect to the measurement reference frame). The target is placed away from the transducer, and is not in contact (either mechanically or electrically) with the transducer (contactless measurement). The transducer includes a primary winding, or inductor, suitable for producing an alternating electromagnetic field, and at least one secondary winding at the terminals whereof an alternating voltage is induced, also referred to as electromotive force or EMF, in the presence of the electromagnetic field produced by the primary winding. The target is a partially or fully conductive element, also referred to as a coupling armature, the presence and/or movement whereof in front of the transducer modifies the coupling between the primary winding and the secondary winding. It should be noted that the effect of the target on the coupling between the primary winding and the secondary winding is dependent on the position of the target with respect to the transducer, but also on the speed thereof with respect to the transducer.

The electromagnetic field distribution is thus formed spatially according to the position and the relative displacement of the target with respect to the transducer. During a displacement of the mechanical part, the spatial distribution of the electromagnetic field changes, and therefore the EMF induced in the secondary winding also changes. The analysis of the EMF induced, at the terminals of the secondary winding, by the electromagnetic field produced by the primary winding, makes it possible to estimate the position and/or the displacement of the target with respect to the secondary winding of the transducer. More particularly but not restrictively, the temporal variations of the EMF amplitude at the terminals of the secondary winding make it possible to estimate the position, speed and/or acceleration of the target with respect to the transducer.

It is specified that, herein and hereinafter in the present application, the term electromotive force range amplitude at the terminals of the secondary winding refers to the instantaneous value adopted by a limited frequency content signal, for example in a frequency band between $-\Delta f$ and $+\Delta f$ about the excitation frequency (i.e. the frequency of the alternating voltage applied at the terminals of the primary winding), where $\Delta f$ could for example adopt a value between 100 Hz and 100 kHz, carrying the information or a part of the characteristic information of the mechanical displacement. This signal is contained in the electromotive force, modulated at the excitation frequency and/or the harmonics thereof. It can be obtained by means of a frequency transposition and filtering method, and more specifically by means of base band transposition and filtering. A preferred example of such a method consists of carrying out synchronous demodulation of the (modulated) electromotive force using a synchronous excitation frequency signal, and wherein the electrical phase has been chosen to meet specific criteria, for example to maximize the signal obtained at the demodulation output. An alternative method consists of computing the modulus of the signal after synchronous demodulation, which involves the advantage and disadvantage of not setting an electrical demodulation phase. It is also specified that the amplitude of the electromagnetic force is a preferred measurement quantity for the implementation of a displacement measurement with the sensors according to the invention, but that it is in no way exclusive from further electrical measurement quantities such as the phase, frequency, or the electrical power at the secondary winding when a load of finite value is connected to the terminals of the secondary winding (load adaptation).

Examples of inductive displacement sensors, and more particularly of eddy-current position sensors have been described in the patent EP0182085.

However, known inductive displacement sensors involve various drawbacks. In particular, known sensors are relatively sensitive to assembly inaccuracies (misalignment, inclination and/or target/transducer distance), as well as the presence of conductive parts in the vicinity of the measurement zone, which poses problems for industrial use. Problems associated with the lack of linearity of the sensor response may also arise. Furthermore, the precision and robustness of the estimation of the position and/or displacement of the target in known sensors would merit being improved. Moreover, it would be desirable to be able to increase the extent of the measurement range of some types of known sensors. In addition, one drawback of known sensors is that they are relatively fragile, which poses problems in some types of application, particularly in an industrial environment.

It would be desirable to be able to have inductive displacement sensors remedying all or some of the drawbacks of known sensors.

Very particular focus is placed herein on angular displacement sensors, and more specifically on angular displacement sensors having an approximately planar general shape, for example sensors having a general disk shape, sensors having a circular annular strip shape having an angular aperture less than or equal to 360°. It will be understood however upon reading the following that all the examples of embodiments, embodiments and alternative embodiments described in the present application can be adapted to further types of inductive displacement sensors, for example inductive linear displacement sensors of the type described in the patent EP0182085 mentioned above. The adaptation of the examples of embodiments described in the present application to further types of inductive displacement sensors is within the grasp of those skilled in the art and therefore will not be detailed hereinafter.

By way of an illustrative but non-restrictive example, the inductive sensors described in the present application and illustrated in the figures have characteristic dimensions (diameter for angular sensors and width for linear sensors) between 5 mm and 200 mm, and preferably between 40 mm and 50 mm.

FIGS. 1A and 1B are respectively a front view and a profile view schematically representing an example of a planar type inductive angular position sensor 100, having a general disk shape.

The sensor 100 comprises a transducer 110 including a primary conductive winding 101 and a secondary conductive winding 103. In FIG. 1B, the primary and secondary windings of the transducer 110 have not been detailed. Preferably, the primary winding 101 comprises two approximately circular, concentric and coplanar conductive turns or loops 101a and 101b, of opposite winding directions and separate radii. Each turn 101a, 101b of the primary winding 101 comprises at least one revolution, preferably a plurality of revolutions. The turns 101a and 101b are preferably connected in series so as to be traversed by currents of the same intensity but in opposite flow directions, but can optionally be connected in parallel so as to see the same voltage at the terminals thereof (applied preferably such that the current flow direction in the two turns are opposite). An advantage of the example of primary winding arrangement in FIG. 1 is that it makes it possible to produce a substantially uniform excitation field in the annular strip situated between the two turns, and substantially zero outside this strip. Alternatively, the primary winding 101 can include a single turn (with one or a plurality of revolutions). More generally, the primary winding 101 can include one or a plurality of concentric turns (with one or a plurality of revolutions each) arranged so as to generate an electromagnetic field in the measurement zone of the transducer. The embodiments described are not restricted to these particular arrangements of the primary winding.

In the example represented, the secondary winding 103 consists of a conductive turn or loop arranged spatially in the shape of a circular annular strip situated between the turns 101a and 101b. The winding 103 is for example situated approximately in the same plane as the turns 101a and 101b, or in a substantially parallel plane.

In this example, in a front view, the turn 103 substantially follows the contour of an angular sector having an angular aperture α of the annular strip defined by the turns 101a and 101b. The turn 103 particularly comprises radial portions and ortho-radial portions of the contour of the annular strip portion. Such a winding enables an angular position measurement over a range of α°. In the example represented, the angular aperture α of the turn 103 is approximately equal to 30°. The embodiments described are however not restricted to this particular case. Alternatively, the angle α can adopt any value between 0 and 180°. The turn 103 preferably comprises a single revolution but can optionally comprise a plurality of revolutions. The primary 101 and secondary 103 windings are for example arranged in and on the same dielectric substrate (not shown) in the form of a wafer of some micrometers to some millimeters in thickness, for example a PCB ("Printed Circuit Board") type substrate.

The sensor 100 further comprises a target 111 comprising a conductive pattern 107, situated at a distance different to zero from the transducer and suitable for moving with respect to the transducer. In FIG. 1A, only the conductive part 107 of the target has been represented. In this example, the conductive pattern 107 of the target 111 has substantially the same shape as the annular strip portion defined by the pattern of the turn 103 of the transducer. The target is rotatably mounted about an axis Z orthogonal to the plane of the transducer passing through the center of the turns 101a and 101b, such that, when the target rotates by an angle 2α about the axis Z, the conductive pattern 107 (having the angular aperture α), covers approximately entirely and then uncovers approximately entirely the surface of the annular strip defined by the turn of the secondary winding 103 of the transducer. By way of non-restrictive example, the target can consist of a plate made of a dielectric material, for example in the shape of a disk, wherein one face oriented towards the transducer is partially coated with a layer of a conductive material, optionally magnetic, for example a metal layer, for example a layer of iron, steel, aluminum, copper, etc., forming the conductive pattern 107. Alternatively, the target can consist solely of a portion of metal plate cut to the shape of the conductive pattern 107, mounted by any suitable means so as to be able to move in rotation with respect to the transducer above the portion of annular strip defined by the turns 101a and 101b.

Figure 2:
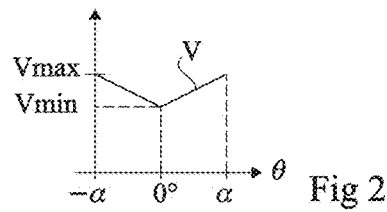
FIG. 2 is a diagram schematically illustrating the operation of the sensor in FIG. 1.

The operation of the sensor 100 in FIGS. 1A and 1B will now be described with reference to FIG. 2 which represents the progression of the amplitude of the electromotive force V at the terminals of the secondary winding 103 of the sensor according to the angular position θ of the target 111 with respect to the transducer 110.

In operation, the flow of an alternating current $I_P$ is applied by electrical means in the primary winding 101. The flow of the current $I_P$ in the winding 101 produces an electromagnetic field B having, in the absence of a target, a substantially symmetrical distribution by revolution in the circular annular strip traversed by the secondary winding 103. By way of non-restrictive example, the frequency of the alternative excitation current $I_P$ applied in the primary winding is between 500 kHz and 50 MHz (for example 4 MHz). The amplitude of the current $I_P$ is for example between 0.1 mA and 100 mA (for example 2 mA). In the absence of a target 111, or, more generally, when the conductive pattern 107 of the target does not cover the secondary winding 103, the secondary winding 103 supplies between the ends thereof an alternating EMF V, having a frequency substantially equal to the excitation frequency of the primary winding, and having an amplitude in principle different to zero. When the conductive pattern 107 of the target 111 covers all or part of the secondary winding 103, the spatial electromagnetic field distribution in the vicinity of the turn 103 varies according to the arrangement and the displacement of the surface portion of the conductive pattern 107 situated facing the turn 103. A further formulation consists of considering that, under the effect of the magnetic excitation generated by the flow of the current $I_P$ in the primary winding, eddy currents appear in the conductive pattern 107, inducing a modification of the spatial distribution of the electromagnetic field according to the arrangement and the displacement of the surface portion of the pattern 107 situated facing the turn 103. These changes or variations of the spatial distribution of the electromagnetic field according to the arrangement and the displacement of the surface portion of the pattern 107 situated facing the turn 103, are conveyed, by induction, by variations or changes in the amplitude V of the voltage range at the terminals of the secondary winding, according to the arrangement and the displacement of the surface portion of the pattern 107 situated facing the turn 103.

It is considered by way of non-restrictive illustrative example that the target can move in rotation about the axis Z with respect to the transducer, in a range of angular positions from θ=−α° to θ=α°. It is considered arbitrarily that the position θ=−α° corresponds to the arrangement represented in FIG. 1A, wherein the conductive pattern 107 does not conceal the turn 103, but has, viewed from above, a radial edge adjoined to a radial edge of the turn 103. As such, for the angular positions θ ranging from −α° to 0°, the surface area of the portion of the conductive pattern 107 situated facing the turn 103 increases when the angular position θ increases, and, for the angular positions θ ranging from 0° to α°, the surface area of the portion of the conductive pattern 107 facing the turn 103 decreases when the angular position θ increases. Outside the range of angular positions ranging from θ=−α° to θ=α°, the surface area of the portion of the conductive pattern 107 facing the turn of the secondary winding 103 is zero, and the position and/or the displacement of the target 111 with respect to the transducer cannot be measured.

The amplitude V of the range of the voltage measured at the terminals of a secondary winding of an inductive displacement sensor is theoretically proportional to the area of the portion of surface area of the conductive pattern of the target situated facing the secondary winding. As such, as seen in FIG. 2, for the angular positions θ ranging from −α° to 0°, the signal V decreases when the angular position θ increases, changing from a high value $V_{max}$ for θ=−α° to a low value $V_{min}$ for θ=0°, and for the angular positions θ ranging from 0° to α°, the signal V increases when the angular position θ increases, changing from the low value $V_{min}$ for θ=0° to the high value $V_{max}$ for θ=α°. The signal V is thus theoretically a triangular signal varying linearly between $V_{min}$ and $V_{max}$ over the angular range ranging from −α° to α°. It will be seen hereinafter that, in practice, the signal V has non-linearity zones and consequently tends to have a sinusoidal shape.

As such, in the range of angular positions from θ=−α° to θ=0°, or in the range of angular positions from θ=0° to θ=α°, the measurement of the amplitude V of the range of the electromotive force at the terminals of the secondary winding 103 makes it possible to determine the angular position θ of the target with respect to the transducer. Although the value of the signal V varies according to the angular position θ of the target in the two angular position ranges mentioned above, the measurement of the signal V does not make it possible to discriminate the position values of the range from $-\alpha°$ to $0°$ from the position values of the range from $0°$ to $\alpha°$ (non-surjective measurement). The extent of the range of angular positions that could actually be measured by the sensor 100 is thus approximately equal to $\alpha°$, provided that the angle $\alpha$ does not exceed $180°$.

Figures 3A, 3B:
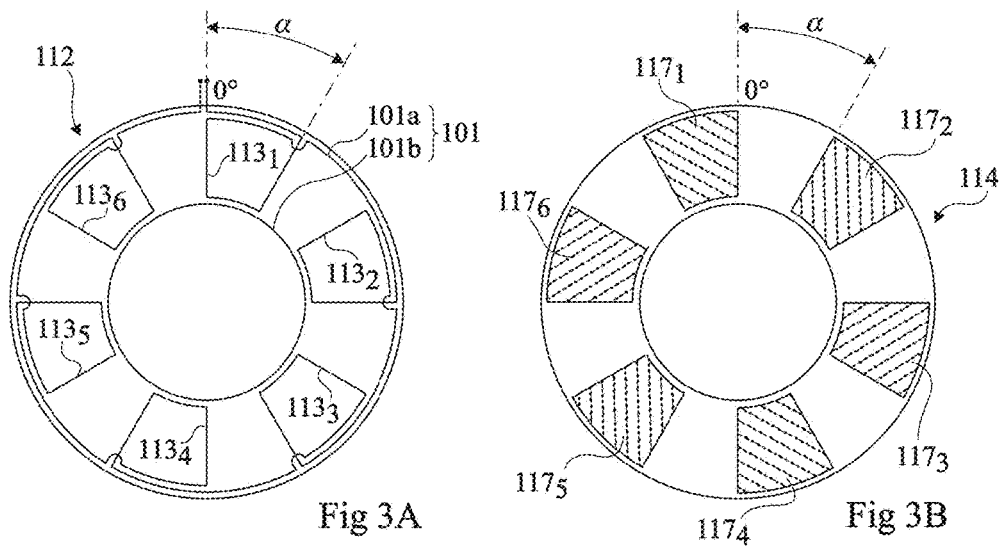
FIGS. 3A and 3B are front views schematically representing a transducer and a target of a further example of an inductive angular displacement sensor.

FIGS. 3A and 3B are front views schematically representing a further example of an inductive angular position sensor having a general disk shape. This sensor comprises a transducer 112 represented in FIG. 3A and a target 114 represented in FIG. 3B. The target 114 in FIG. 3B differs from the target 111 in FIG. 1A essentially by the conductive pattern thereof. In particular, the target 114 in FIG. 3B differs from the target 111 in FIG. 1A in that it no longer comprises a single conductive pattern 107, but a set of N conductive patterns 117$_i$ rigidly connected to the target, and suitable for moving with respect to the transducer, N being an integer greater than or equal to 2 and i being an integer ranging from 1 to N. The transducer 112 in FIG. 3A differs from the transducer 110 in FIG. 1A essentially by the shape of the secondary winding 113 thereof. In particular, the secondary winding 113 of the transducer 112 in FIG. 3A no longer comprises a single conductive turn, but a set of N turns 113$_i$. The target 114 in FIG. 3B is intended to be rotatably mounted with respect to the transducer 112 in FIG. 3A, similarly or identically to that described with reference to FIGS. 1A and 1B.

In this example, in a front view, the set of conductive patterns 117$_i$ and the set of turns 113$_i$, consist of the repetition by revolution of N substantially identical patterns, respectively 117$_i$ and 113$_i$. The repetition by revolution of these patterns is performed with a spatial frequency of $2\alpha$, i.e. each pattern having an angular aperture substantially equal to $\alpha°$ is spaced from the closest neighbor thereof by a portion of empty circular annular strip of ortho-radial range substantially equal to $\alpha°$.

For sensors wherein the general shape is a closed circular annular strip, i.e. having an angular aperture equal to $360°$, the value of the angular aperture $\alpha$ of the patterns is chosen preferably such that $\alpha=360°/2N$, in order to ensure a whole number of pattern repetitions per revolution (over $360°$). In the example in FIGS. 3A and 3B, N=6 and $\alpha=30°$.

In other words, the transducer in FIG. 3A comprises a secondary winding 113 comprising N loops or turns 113$_i$ in series. Each turn 113$_i$ has a shape of a circular band strip sector, of the same type as the turn 103 in FIG. 1A, and has an angular dimension approximately equal to $\alpha=360°/2N$ (i.e. $\alpha=30°$ in this example). The N turns 113*i* are regularly distributed along the $360°$ of the circular annular strip approximately defined by the turns 101*a* and 101*b* of the primary winding 101, i.e. two consecutive turns 113$_i$ of the secondary winding are separated by an annular strip portion having an angle approximately equal to $\alpha$.

The target in FIG. 3B comprises N conductive patterns 117$_i$. Each pattern 117$_i$ has a shape of a circular band strip sector, of the same type as the conductive pattern 107 in FIG. 1, and has an angular dimension approximately equal to $\alpha=360°/2N$. The N conductive patterns 117*i* are regularly distributed along an annular strip of the target intended to be positioned facing the annular strip of the transducer containing the turns 113*i*.

Hereinafter in the present application, the term multi-pole sensor shall refer to the sensors of the type described with reference to FIGS. 3A and 3B, N denoting the number of poles of the sensor. In the example in FIG. 1A, if $\alpha$ adopts the value $180°$, reference is made to a sensor with one pole pair. More particularly, the term multi-pole sensor shall denote a sensor wherein an elementary conductive pattern is regularly repeated at least twice on the target along a parallel direction with a degree of freedom of displacement of the target with respect to the transducer (i.e. along an ortho-radial direction in an angular sensor of the type described above).

By analogy with the electrical period of an electric motor with a plurality of pole pair, reference shall now be made to the angular aperture between two adjacent patterns 117$_i$, and to the angular aperture between two adjacent patterns 113$_i$, as being the electrical period of the sensor. In the specific case of the sensor in FIGS. 3A and 3B, for which the conductive patterns have an angular aperture $\alpha°$ and the hollows between these patterns also have an angular aperture $\alpha°$, the electrical period is equal to $2\alpha°$, and, conversely, the angular aperture of a conductive pattern is equal to an electrical half-period of the sensor, which is a preferred but not exclusive case. By design, for sensors wherein the general shape is a closed circular annular strip, an electrical period is preferably a sub-multiple of $360°$, since $\alpha=360°/2N$. Under these terms, a multi-pole inductive sensor has a measurement range of $\alpha°$, equal to half the electrical period thereof of $2\alpha°$. In the example in FIG. 1A, if $\alpha$ adopts the value $180°$, the electrical period is equal to $360°$, and the measurement range is approximately equal to half the electrical period, i.e. $180°$. In the example in FIGS. 3A and 3B for which $\alpha=30°$, the electrical period is $2\alpha=60°$, and the measurement range is approximately equal to half the electrical period i.e. $\alpha=30°$.

Figure 4:
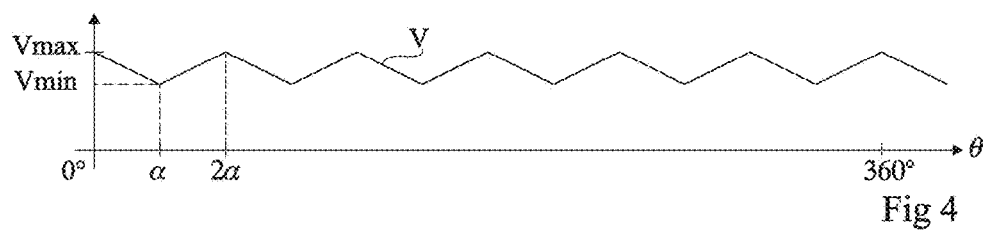
FIG. 4 is a diagram schematically illustrating the operation of the sensor in FIGS. 3A and 3B.

FIG. 4 is a diagram representing the progression of the amplitude V of the range of the electromotive force at the terminals of the secondary winding 113 of the sensor in FIGS. 3A and 3B according to the angular position $\theta$ of the target with respect to the transducer.

As seen in FIG. 4, when the angular position $\theta$ of the target with respect to the transducer varies from $0°$ to $360°$, the signal V varies periodically between a high value $V_{max}$ and a low value $V_{min}$, with an angular period of variation approximately equal to the electrical period $2\alpha$ of the sensor.

The amplitude of the range of angular positions $\theta$ suitable for being measured by the sensor in FIGS. 3A and 3B is approximately equal to half of the electrical period, i.e. $\alpha°$.

One advantage of the sensor in FIGS. 3A and 3B with respect to the sensor in FIGS. 1A and 1B is that the greater number of patterns distributed on the target and on the transducer enables a distributed measurement on an extended measurement zone, wherein each pattern contributes locally and by design to the generation of an overall electromotive force, this electromotive force being more immune to positioning errors of the target with respect to the transducer than in the sensor in FIGS. 1A and 1B, wherein the measurement made is a local measurement made using a single set of patterns 107-103. This robustness of the measurement is especially great as the number N of pairs of poles of the sensor increases.

Figure 5:
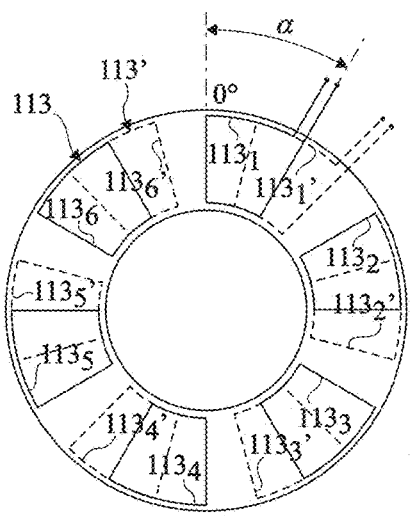
FIG. 5 is a front view schematically representing a transducer of a further example of an inductive angular displacement sensor.

FIG. 5 illustrates an alternative embodiment of the sensor in FIGS. 3A and 3B. In FIG. 5, only the transducer of the sensor has been shown, the target being identical to that in FIG. 3B.

The transducer of the sensor in FIG. 5 comprises the same elements as the transducer in FIG. 3A, and further comprises a second secondary winding 113' comprising N loops or turns 113$_i$' in series. For the purposes of clarity, the connections between the different loops 113$_i$ of the winding 113 and the connections between the different loops 113$_i$' of the winding 113' have not been shown in FIG. 5. The secondary winding 113' (represented as a dashed line) is substantially identical to the secondary winding 113 (represented as a solid line), and is arranged in the same annular strip of the transducer as the secondary winding 113, with an angular offset corresponding to a quarter of the electrical period of the sensor, i.e. approximately equal to $\alpha/2$, with respect to the secondary winding 113.

Figure 6:
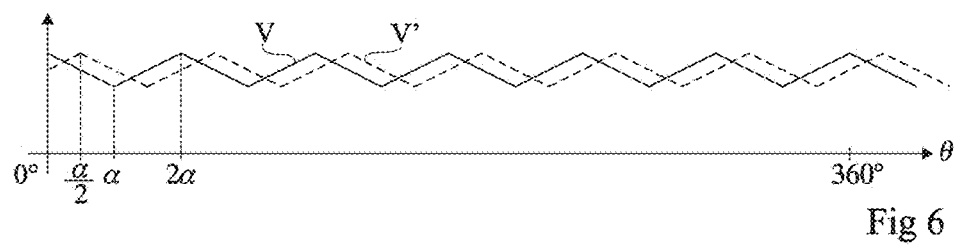
FIG. 6 is a diagram schematically illustrating the operation of the sensor in FIG. 5.

FIG. 6 is a diagram representing the progression of the amplitude V (as a solid line) of the range of the electromotive force at the terminals of the secondary winding 113 of the sensor in FIG. 5, and the progression of the amplitude V' (as a dashed line) of the range of the electromotive force at the terminals of the secondary winding 113' of the sensor in FIG. 5, according to the angular position $\theta$ of the target with respect to the transducer.

As seen in FIG. 6, when the angular position $\theta$ of the target with respect to the transducers varies from 0° to 360°, the signals V and V' vary periodically between a high value $V_{max}$ and a low value $V_{min}$, with a variation period equal to the electrical period of the sensor, i.e. approximately equal to $2\alpha°$ in this example, and with an angular offset with respect to one another substantially equal to one quarter of the electrical period of the sensor, i.e. approximately $\alpha/2°$ in this example.

One advantage of the transducer in FIG. 5 with respect to the transducer in FIG. 3A is that it makes it possible to extend the range of angular positions $\theta$ suitable for being measured by the sensors up to approximately an entire electrical period (i.e.) $2\alpha°$), instead of a half-period (i.e. $\alpha°$) in the example in FIGS. 3A and 3B.

Figure 7:
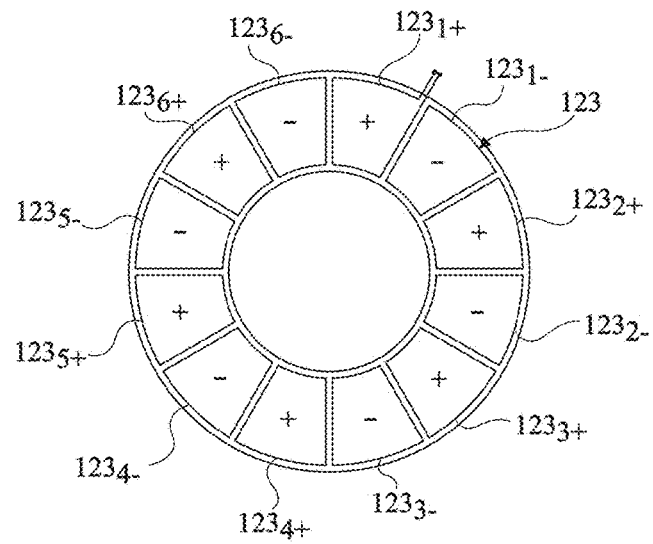
FIG. 7 is a front view schematically representing a transducer of a further example of an inductive angular displacement sensor.

FIG. 7 illustrates a further alternative embodiment of the sensor in FIGS. 3A and 3B. In FIG. 7, only the transducer of the sensor has been shown, the target being identical to that in FIG. 3B.

The transducer of the sensor in FIG. 7 differs from the transducer in FIG. 3A essentially by the shape of the secondary winding thereof. The transducer of the sensor in FIG. 7 comprises a secondary winding 123 comprising 2N loops or turns of alternating winding directions, interconnected in series. In other words, the secondary winding 123 comprises 2N patterns of electrical circuits or turns, each being connected to the closest neighbor thereof in anti-series. More particularly, the winding 123 comprises N turns $123_{i+}$ of the same winding direction, substantially identical to the N turns $113_i$ of the transducer in FIG. 3A, and further comprises N turns $123_{i-}$ of opposite winding direction, each turn $123_{i-}$ being arranged between two consecutive turns $123_{i+}$, and each turn $123_{i-}$ having a shape of a circular annular strip sector, of the same type as the turns $123_{i+}$. For the purposes of clarity, the connections between the turns $123_{i+}$ and $123_{i-}$ of the winding 123 have not been shown in FIG. 7, and the two winding directions have been represented schematically by a + sign for the turns $123_{i+}$ and by a – sign for the turns $123_{i-}$.

More specifically, in the example in FIG. 7, the angular aperture $\alpha$ of each turn $123_{i+}$ and $123_{i-}$ has been chosen strictly less than an electrical half-period so as to enable a more legible graphic representation. In practice, the angular aperture $\alpha$ of each turn $123_{i+}$ and $123_{i-}$ can approximate an electrical half-period with a lower value, with an exact value, or with a greater value. In the specific case where the angular aperture equals exactly one electrical half-period, which is a preferred but non-exclusive example of an embodiment, the sum of the angular apertures of the N turns $123_{i+}$ and of the angular apertures of the N turns $123_{i-}$ equals 360°, or in other words, the constituent radial tracks of two adjacent turns $123_{i+}$ and $123_{i-}$ share the same spatial coordinates in a reference frame {R, $\theta$} (not shown) directed by the axis Z and having as a center the center of the sensor. This obviously does not mean however that these tracks are merged and that the turns $123_{i+}$ and $123_{i-}$ are short-circuited, insofar as the tracks can be positioned on two separate planes along the axis Z.

The spatial repetition period between two adjacent turns $123_{i+}$, and the spatial repetition period between two adjacent turns $123_{i-}$, are kept equal to one electrical period of the sensor regardless of the angular aperture $\alpha$ of the turns $123_{i+}$ and $123_{i-}$. A preferred but non-restrictive example of use of such a set of turns having an angular aperture different from an electrical half-period of the sensor consists of distributing the turns $123_{i+}$ and $123_{i-}$ regularly ortho-radially as illustrated in FIG. 7.

Figure 8:
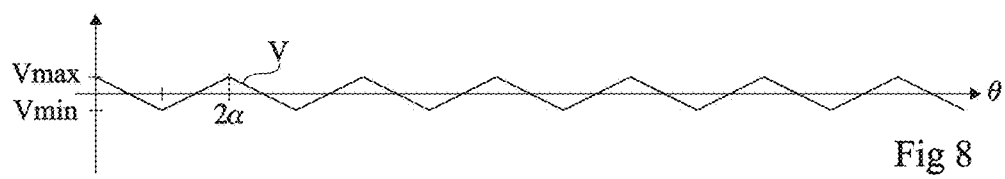
FIG. 8 is a diagram schematically illustrating the operation of the sensor in FIG. 7.

FIG. 8 is a diagram representing the progression of the amplitude V of the range of the electromotive force at the terminals of the secondary winding 123 of the sensor in FIG. 7 according to the angular position $\theta$ of the target with respect to the transducer.

As seen in FIG. 8, when the angular position $\theta$ of the target with respect to the transducer varies from 0° to 360°, the signal V varies periodically between a high value $V_{max}$ and a low value $V_{min}$, with an angular period of variation approximately equal to one electrical period.

One advantage of the transducer in FIG. 7 with respect to the transducer in FIG. 3A is that the amplitude V is approximately centered around 0 volts ($V_{min} \approx -V_{max}$). More generally, the use of a spatially differential measurement, such as that which is for example described with reference to FIG. 7, makes it possible to a low mean amplitude V with respect to the values $V_{min}$ et $V_{max}$. This simplifies the processing of the measurement for the purposes of estimating the displacement, and in particular reduces the influence of drift and parasitic disturbances.

Indeed, some variations of the amplitude V associated with parasitic effects, i.e. not originating from the displacement of the target, are merely conveyed by a gain variation in the case of the sensor in FIG. 7, whereas they are conveyed both by a gain variation and an offset variation in the case of the sensor in FIG. 3A. This is for example the case when the coupling coefficient between the primary, the target and the secondary varies due to a parasitic variation of the target-transducer distance. This is furthermore the case when the amplitude of the excitation current varies, for example in the case of parasitic fluctuation of the power supply voltage, or in the event of drift of the electrical properties of the primary winding, for example according to the temperature and the relative distance of the transducer and the target.

Moreover, in the example in FIG. 7, the coupling of the secondary winding with external fields not carrying information on the displacement of the target, is considerably reduced due to the spatially differential nature of the measurement. This is particular the case for the portion of the electromagnetic field generated by the primary which induces the constant portion (independent of the target position) of the amplitude of the EMF, but also for any external electromagnetic interference exhibiting a substantially uniform distribution in the vicinity of the secondary winding 123.

The alternative embodiment in FIG. 7 can be combined with the alternative embodiment in FIG. 5 in order to obtain two signals of amplitude V and V' angularly offset by a quarter of an electrical period and centered on approximately 0 volts.

It should be noted that the fact that the amplitude V of the range of the EMF is approximately centered on 0 volts does not necessarily mean that the modulated electromotive force verifies said properties before the implementation of a method of frequency transposition and filtering. Generally, the electromotive force (modulated) has a mean value different to zero, either due to voluntary referencing of one of the two terminals of the secondary winding at a defined electric potential (electrical mass for example), or due to referencing by capacitive coupling of the mean potential thereof to the potential of the environment (for example the mechanical mass) in the case of a high-impedance measurement at the secondary winding. This illustrative example applied to the mean value of the electromotive force is also applicable to any frequency component of the electrical signal, regardless of the origin thereof, which is situated outside a frequency band of interest $-\Delta f$ to $+\Delta f$ about the modulation frequency, or, in other words, which is situated outside a frequency band of interest $-\Delta f$ to $+\Delta f$ about the zero frequency following the frequency transposition method.

First Aspect

Figure 9A:
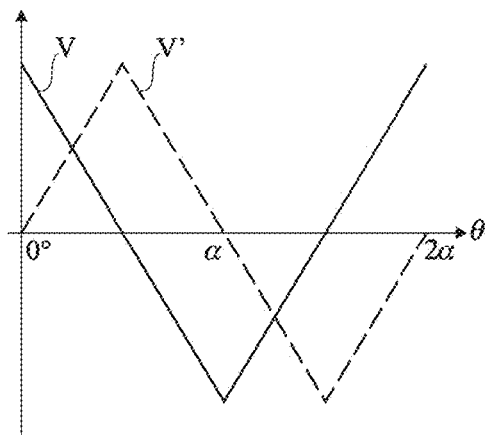
FIG. 9A is a diagram representing the expected theoretical progression of output signals of an inductive angular displacement sensor.

FIG. 9A is a diagram representing the expected theoretical progression of the signals of amplitude V and V' according to the angular position θ, in an inductive sensor of the type described above combining the embodiment options in FIGS. 5 (two secondaries spatially offset by one quarter of an electrical period) and 7 (each secondary comprises 2N turns of alternating winding directions). As seen in FIG. 9A, the expected theoretical amplitudes V and V' are triangular periodic signals having a period equal to the electrical period of the sensor, varying linearly between the values $V_{min}$ and $V_{max}$, with an angular offset of one quarter of an electrical period with respect to one another. Indeed, in theory, as indicated in the patent EP0182085 mentioned above (column 12, lines 22 to 57), the amplitude of the range of the voltage measured at the terminals of secondary winding of an inductive sensor is proportional to the area of the portion of surface of conductive patterns of the target situated facing this secondary winding. However, in the examples of embodiments described above, the portion of conductive surface of the target situated facing the electrical circuit patterns or turns of the secondary winding varies linearly with the angular position θ, for the patterns $123_{i+}$ and for the patterns $123_{i-}$ in FIG. 7. Therefore, the signals V and V' should vary linearly by portions according to the position θ.

The inventors observed, however, that in practice the variation of the signals V and V' according to the position θ generally has wide non-linear zones in an electrical period of the sensor. More specifically, in practice, the variation of the signals V and V' according to the position θ indeed has two substantially linear zones of reduced range in an electrical period of the sensor, these zones being approximately centered on the zero crossings of the amplitudes V and V', but, between these linear zones, saturated and de facto less linear zones are inserted, these zones being approximately centered on extrema of the amplitudes V and V'.

The low linearity of the amplitudes V and V' according to the position θ involves drawbacks. In particular, by way of non-restrictive example, having ranges of reduced linearity does not make it possible to benefit fully from the signal processing methods described in the patents FR2914126 and FR2891362.

Figure 9B:
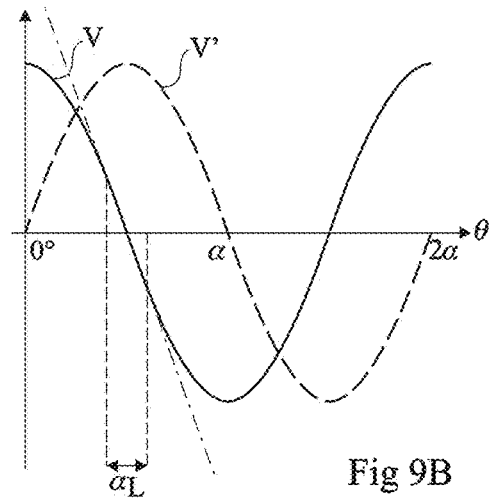
FIG. 9B is a diagram representing the actual progression, typically obtained in practice, of the output signals of an inductive angular displacement sensor.

FIG. 9B is a diagram representing the actual progression, typically obtained in practice, of the signals V and V' according to the angular position θ in an inductive sensor of the type described above. As seen in FIG. 9B, the signals V and V' only vary linearly in portions of reduced angular range $\alpha_L$ of the measurement range of the sensor, referred to as linearity ranges. By way of example, each linearity range $\alpha_L$ has a range between 20% and 90% of the electrical half-period of the sensor (equal to α° in the example shown). The linearity range $\alpha_L$ is for example defined as being the maximum angular range, substantially centered on the mean value of the amplitude V, for which it is possible to find a linear approximation $V_L$ to the amplitude V, such that the difference $E_L$ between the linear approximation $V_L$ and the amplitude V is less than a threshold $E_{L0}$, the threshold $E_{L0}$ being for example defined as a percentage of the extrema of the amplitude V, for example in a range of values between 0.01% and 10% of the extrema of the amplitude V according to the degree of linearity sought for the sensor. In other words, the linearity range $\alpha_L$ is the maximum angular range whereon the amplitude V varies substantially linearly with the position of the target with respect to the transducer, within one maximum approximation of set value $E_{L0}$. In practice, it is generally sought to do the opposite, i.e. evaluate the maximum linearity error $E_{LM}$ over a given angular range $\alpha_L$, for example but not restrictively the angular range whereon it is sought to make the measurement. Also, a further manner to assess the linearity of a sensor is that of assessing the linearity error $E_{LM}$, defined as the maximum difference between the amplitude V and the linear approximation $V_L$ for a given range $\alpha_L$. Preferably but not restrictively, the linearity range sought for a sensor with two secondary windings is at least 50% of an electrical half-period, for example between 50% and 80% of an electrical half-period when the displacements to be measured are rapid and the observation of a plurality of samples of the amplitude requires going beyond 50% of an electrical half-period. In a further preferred example, the linearity range sought for a sensor with three secondary windings is at least 33% of an electrical half-period, for example between 33% and 50% of an electrical half-period when the displacements to be measured are rapid. Hereinafter, unless specified otherwise and without being considered to be an exclusive choice, the description will be limited to presenting a sensor with two secondary windings, and the purposes of legibility, the description will be limited to presenting the linearity error over a sought linearity range of 50% of an electrical half-period, without explicitly mentioning these terms, and referring to the linearity error defined under these terms by merely mentioning the linearity error $E_L$.

The inventors particularly observed that, for a given target-transducer distance (and for a given range $\alpha_L$), the linearity error $E_L$ generally increases as the number N of poles of the sensor increases.

However, this restriction does not indicate industrial use of an inductive sensor insofar as such a use generally requires a high number of poles, typically N=6, to ensure a robust measurement as stated above.

It would be desirable to be able to have inductive displacement sensors, and particularly multi-pole sensors, having a lower linearity error (or broader linearity ranges) than existing sensors, in order in particular to facilitate the processing of the amplitudes supplied by the sensor. By way of non-restrictive example, extending the linearity ranges can make it possible to benefit from the signal processing methods described in the patents FR2914126 and FR2891362.

According to a first aspect, it is sought, in an inductive displacement sensor, and particularly (but not only) a multi-pole sensor, for example sensor with two pole pairs or more and preferably a sensor with six pole pairs or more, to reduce the linearity error $E_L$ over a given angular range $\alpha_L$, for example over a range $\alpha_L$ extending over half an electrical half-period of the sensor for a sensor with two secondary windings, or over a range $\alpha_L$ extending over one third of an electrical half-period for a sensor with three secondary windings. It can also be taken into consideration that it is sought to increase the extent of the linearity range of the sensor, i.e. the extent of the position range, included in the measurement range of the sensor, wherein the amplitude of the range of the electromotive force at the terminals of a secondary winding of the sensor varies approximately linearly according to the angular position θ of the target with respect to the transducer.

The studies conducted by the inventors demonstrated that the extents of the linearity range of an inductive sensor is dependent on the target-transducer distance d, sometimes referred to as air gap, i.e. the distance between the median plane of the secondary winding(s) of the transducer, and the conductive patterns of the target. By way of example, the target-transducer distance d is defined as being the distance between the median plane of the secondary winding(s) of the transducer and the surface of the conductive patterns of the target oriented towards the transducer.

Figure 10:
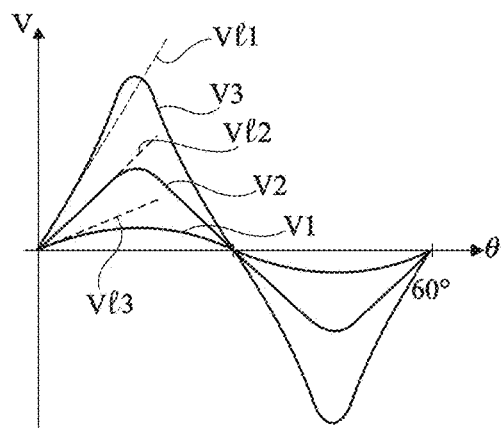
FIG. 10 is a diagram representing, for a plurality of distinct target-transducer distances, the progression of an output signal of an inductive angular displacement sensor.

FIG. 10 is a diagram representing, for a plurality of separate target-transducer distances in an inductive sensor of the type described above (for example of the type described with reference to FIG. 7, where N=6 pole pairs), the progression of the amplitude V of the range of the electromotive force measured at the terminals of a secondary winding of the transducer according to the angular position θ of the target. The curve V1 represents the progression of the amplitude V for a target-transducer distance d1, the curve V2 represents the progression of the amplitude V for a target-transducer distance d2 less than d1, and the curve V3 represents the progression of the amplitude V for a target-transducer distance d3 less than d2. The line V11, in dotted-line format, represents the linear approximation of the amplitude V1, the line V12, in dotted-line format, represents the linear approximation of the amplitude V2, and the line V13, in dotted-line format, represents the linear approximation of the amplitude V3. As seen in FIG. 10, the signal V has, at the distance d3, a maximum amplitude greater than the maximum amplitude obtained at the distances d2 and d1. On the other hand, the linearity error $E_{L2}$ of the amplitude V, at the distance d2, is less than the linearity errors $E_{L1}$ and $E_{L3}$ of the amplitude V at the distances d1 and d3 respectively.

Figure 11:
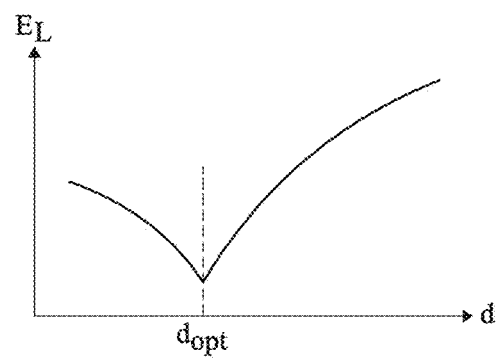
FIG. 11 is a diagram representing the progression, according to the target-transducer distance, of the linearity error of an output signal of an inductive angular displacement sensor.

FIG. 11 is a diagram representing the progression, according to the target-transducer distance, of the linearity error $E_L$ of the amplitude V of the range of the electromotive force measured at the terminals of a secondary winding of the transducer of an inductive displacement sensor, for example a sensor of the type described with reference to FIG. 7 (where N=6 pole pairs). In this example, the linearity error $E_L$ corresponds, in a given range of angular positions θ extending for example over half of the electrical period of the sensor (over a monotone portion of the EMF), at the maximum difference (in absolute value) between a linear approximation of the response of the sensor and the actual response measured. As seen in FIG. 11, there is an optimal target-transducer distance $d_{opt}$ for which the linearity error $E_L$ passes through a minimum. More generally, the inventors observed that a minimum linearity error can be observed in all the types of inductive displacement sensor, regardless of the number of pole pairs in particular. This minimum value is achieved for an optimal target-transducer distance which is dependent on the configuration of the sensor (and particularly on the number of pole pairs). It is thus theoretically possible to obtain a linear response regardless of the inductive sensor. The term theoretically denotes that, when the number of pole pairs N is particularly high, the distance $d_{opt}$ becomes extremely small so as no longer to be measurable in practice during the limited precision and constraints of use of suitable measuring instruments.

According to a first embodiment, an inductive displacement sensor is envisaged wherein the target-transducer distance d is between 0.8 and 1.5 times the distance $d_{opt}$ for which the linearity error of the amplitude measured by the sensor is minimal. It should be noted that this optimal distance can easily be determined using tests, for example by plotting curves of the type represented in FIG. 11.

The inventors observed however that, in practice, for some sensors, and particularly sensors having a high number N of pole pairs, typically greater than or equal to three and more particularly for N greater than or equal to six, the optimal target-transducer distance in terms of linearity can be relatively small, for example less than 0.2 mm, which can pose problems for some types of measurement, particularly in industrial environments wherein such distances are unacceptable, particularly due to manufacturing, assembly and use tolerances.

Moreover, the inventors observed that the optimal target-transducer distance in terms of linearity is dependent on a plurality of further parameters, including geometric parameters of the sensor such as the outer diameter of the transducer and/or the target. More particularly, the inventors observed that when the diameter of the sensors increases, the optimal target-transducer distance increases and can adopt a relatively high value, for example greater than 1 mm, which can pose problems for some types of measurements, particularly in industrial environments wherein it is sought to ensure a somewhat compact design.

In the case where the optimal target-transducer distance in terms of linearity is incompatible (excessively high or excessively low) with the measurement environment, it is possible to envisage positioning at the closest possible target-transducer distance to the optimal distance in the environmental constraint limits, and correcting the non-linearity by applying mathematical processing (post-processing) of the measurement signal. The inventors observed however that, in practice, this solution has limitations in terms of precision and robustness, and is not satisfactory particularly for the implementation of the signal processing methods described in the patents FR2914126 and FR2891362.

A first solution proposed by the inventors and illustrated by FIGS. 12A to 12D, 13A to 13C, 14 and 15, is that of adding to the sensor an additional electromagnetic field confinement part, placed at a specific distance from the primary winding of the transducer, chosen so as to increase the target-transducer distance significantly in terms of linearity.

FIGS. 12A to 12D are cross-sectional views schematically illustrating four examples of embodiments of an inductive angular displacement sensor.

Figure 12A:
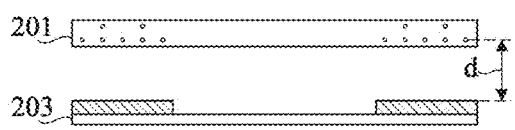
FIGS. 12A to 12D are cross-sectional views schematically illustrating four examples of embodiments of an inductive angular displacement sensor.

In the example in FIG. 12A, the sensor comprises a transducer 201 and a target 203, arranged at a target-transducer distance d (d being in this example the distance between the median plane of the secondary winding(s) of the transducer and the plane of the surface of the conductive patterns of the target oriented towards the transducer), and does not comprise an additional field confinement part.

Figure 12C:
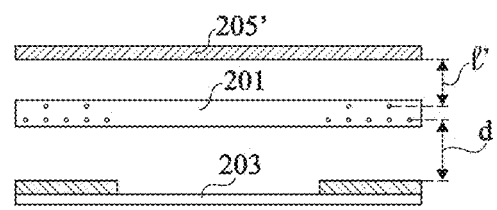
Figure 12B:
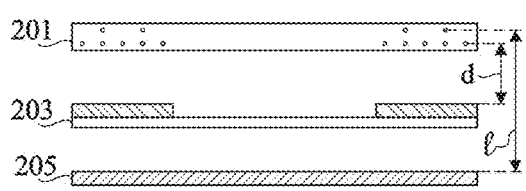

In the example in FIG. 12B, the sensor comprises a transducer 201 and a target 203, arranged at a target-transducer distance d, and further comprises an additional field confinement part 205 made of a conductive material, for example made of the same material as the conductive patterns of the target, or of any other conductive material, optionally magnetic, such as iron, steel, aluminum, copper, etc. In this example, the part 205 is arranged on the side of the target 203 opposite the transducer 201 (i.e. the target 203 is situated between the transducer 201 and the part 205), the surface of the part 205 oriented towards the target 203 being preferably approximately parallel with the median plane of the transducer, and therefore also approximately parallel with the median plane of the target (subject to assembly imprecision). The field confinement part 205 is preferably periodic along a parallel direction with a degree of freedom of displacement of the sensor, i.e. periodic by revolution (about an axis which is approximately the axis of symmetry of the target) in the case of an angular position sensor, the spatial period of the conductive patterns of the confinement part being preferably separate from that of the conductive patterns of the target. By way of illustrative but non-restrictive example, the part 205 is symmetric by revolution. The part 205 is arranged at a part-transducer distance l, defined in this example as being the distance between the median plane of the primary winding(s) of the transducer, and the plane of the surface of the conductive pattern(s) of the part oriented towards the transducer. The part 205 is preferably rigidly connected to the target, i.e. movable with respect to the transducer when the position of the target with respect to the transducer changes.

In the example in FIG. 12C, the sensor comprises a transducer 201 and a target 203, arranged at a target-transducer distance d, and further comprises an additional field confinement part 205', for example identical or similar to the part 205 in FIG. 12B. The part 205' is preferably periodic by revolution, and for example symmetric by revolution, about an axis of symmetry which is approximately the axis of symmetry of the primary winding of the transducer. In this example, the part 205' is placed on the side of the transducer 201 opposite the target 203 (i.e. the transducer 201 is situated between the target 203 and the part 205'). The part 205' is arranged at a part-transducer distance l'. By way of example, the distance l' is defined as being the distance between the median plane of the primary winding(s) of the transducer, and the plane of the surface of the conductive patterns of the part oriented towards the transducer. The part 205' is preferably rigidly connected to the transducer, i.e. fixed with respect to the transducer when the position of the target with respect to the transducer changes.

Figure 12D:
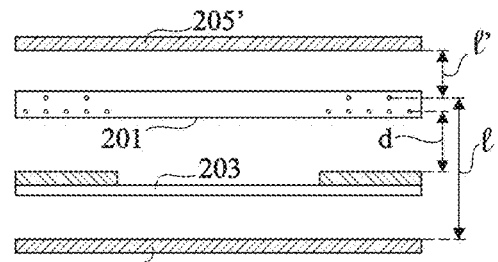

In the example in FIG. 12D, the sensor comprises a transducer 201 and a target 203, arranged at a target-transducer distance d, a first field confinement part 205 (for example identical or similar to the part 205 in FIG. 12B) arranged on the side of the transducer 201 opposite the target 203, at a distance l from the transducer, and a second field confinement part 205' (for example identical or similar to the part 205' in FIG. 12C), arranged on the side of the target 203 opposite the transducer 201, at a distance l' from the transducer (i.e. the transducer 201 and the target 203 are situated between the parts 205 and 205').

The parts 205 and/or 205' can be electrically connected or not, point-wise or in a spatially distributed manner, to other elements of the sensor. In particular, the part 205 can be electrically connected to one or a plurality of conductive patterns of the target, and the part 205' can be electrically connected to an electrical potential available on the transducer, for example at a point of a secondary winding, at a point of the primary winding, or to the ground of the transducer.

Figure 13A:
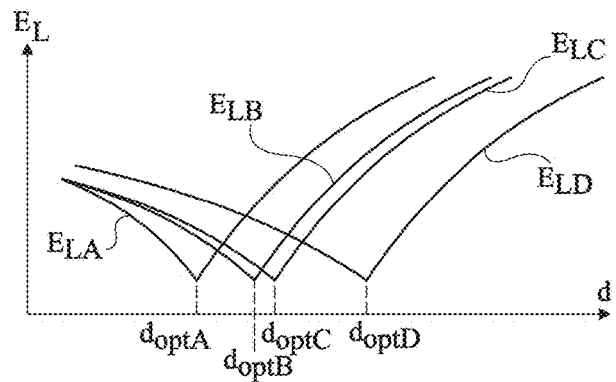
FIG. 13A is a diagram representing, for the four examples of sensors in FIGS. 12A to 12D, the progression, according to the target-transducer, of the linearity error of an output signal of the sensor.

FIG. 13A is a diagram including four curves $E_{LA}$, $E_{LB}$, $E_{LC}$ and $E_{LD}$ representing respectively, for the four examples of a sensor in FIGS. 12A to 12D, the progression of the linearity error $E_L$ of the sensor according to the target-transducer distance. Each of the curves $E_{LA}$, $E_{LB}$, $E_{LC}$ and $E_{LD}$ is of the same type as the curve in FIG. 11, i.e. it passes via a linearity error value for a certain optimal target-transducer distance, $d_{optA}$, $d_{optB}$, $d_{optC}$ and $d_{optD}$, respectively. As seen in FIG. 13A, the distance $d_{optA}$ is less than the distance $d_{optB}$ which is in turn less than the distance $d_{optC}$ which is in turn less than the distance $d_{optD}$. The tests conducted by the inventors demonstrated that adding one or a plurality of additional field confinement parts can increase the optimal target-transducer distance in terms of linearity of an inductive displacement sensor from several tens of millimeters to several millimeters.

The positioning along the axis Z of the additional field confinement part(s), and more specifically the distance between this or these parts and the primary winding of the transducer, has an influence on the effectiveness of the increase in the optimal target-transducer distance in terms of linearity resulting from adding this or these parts. There is therefore a (some) optimal distance(s) $l_{opt}$ and/or $l_{opt}'$ between the primary winding and the additional field confinement part(s), such that the optimal target-transducer distance $d_{opt}$ is increased to attain a value between 0.65 and 1.25 times the distance d at which it is sought to have the sensor operate, this sought value possibly being but not restrictively between 0.5 and 1.5 mm, which is a range of values compatible with various industrial applications.

Figure 13B:
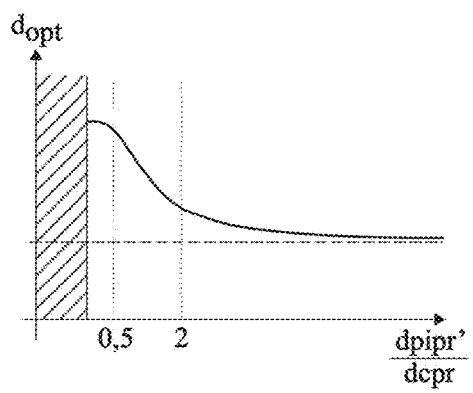
FIG. 13B is a diagram representing the progression of the optimal target-transducer distance in terms of linearity according to a parameter of an example of an inductive displacement sensor.

FIG. 13B is a diagram representing the progression, for an inductive angular displacement sensor of the type described above, of the optimal target-transducer distance $d_{opt}$ in terms of linearity, according to the ratio of the part-primary distance $d_{pipr'}$ over the target-primary distance $d_{cpr}$, in the case of addition of the additional field confinement part 205' as represented in FIG. 12C or 12D. As seen in FIG. 13B, the optimal target-transducer distance in terms of linearity increases as the ratio $d_{pipr'}/d_{cpr}$ decreases.

Figure 13C:
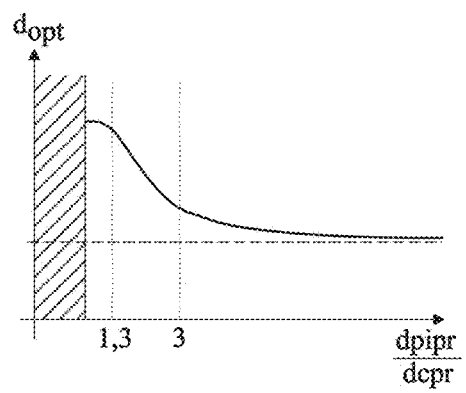
FIG. 13C is a diagram representing the progression of the optimal target-transducer distance in terms of linearity according to a parameter of a further example of an inductive displacement sensor.

FIG. 13C is a diagram representing the progression, for an inductive angular displacement sensor of the type described above, of the optimal target-transducer distance $d_{opt}$ in terms of linearity, according to the ratio of the part-primary distance $d_{pipr}$ over the target-primary distance $d_{cpr}$, in the case of addition of the additional field confinement part 205 as represented in FIG. 12B or 12D. As seen in FIG. 13C, the optimal target-transducer distance in terms of linearity increases as the ratio $d_{pipr}/d_{cpr}$ decreases.

In other words, if the transducer is considered as an assembly wherein the constituent layers are not differentiated, the optimal target-transducer distance $d_{opt}$ can be said to increase as the ratio l/d (respectively l'/d) decreases.

Under these conditions, an illustrative but non-restrictive example of positioning of the additional field confinement parts in FIG. 12D, is that of placing:
 the upper part 205' at a distance from the primary winding approximately between 0.5 and 2 times the distance separating the primary winding and the surface area of the conductive patterns of the target;
 the lower part 205 at a distance from the primary winding approximately between 1.3 and 3 times the distance separating the primary winding and the surface area of the conductive patterns of the target.

As such, for a given sensor configuration, the ratio $d_{pipr}/d_{cpr}$ and/or the ratio $d_{pipr}/d_{cpr}$ can be chosen such that the distance $d_{opt}$ is compatible with the constraints of the application, for example either greater than or equal to 0.3 mm, for example between 0.3 and 10 mm, and preferably between 0.5 and 1.5 mm, particularly for a sensor including a high number N of pole pairs, for example N≥4 and preferably N≥6.

It should be noted that the abovementioned choice of distance between the field confinement part and the transducer is generally not optimal in terms of signal level supplied by the secondary winding(s) of the transducer. Indeed, at this distance, the conductive part 205/205' causes a non-negligible reduction in the level of the signals V and V' supplied by the transducer. It should be noted in particular that in the prior art of inductive angular displacement measurement, it is accepted to separate the conductive parts liable to modify the spatial distribution of the electromagnetic field which is established in the presence of only the primary, secondary and target elements as much as possible. This dimensioning criterion applies in particular in the case of electrostatic screens (or shielding screens), which, when provided, are arranged at distances along the axis Z much greater than the distances envisaged in the embodiments described, so as not to attenuate the wanted signal level measured at the secondary excessively.

However, the embodiments proposed define a compromise which may be appropriate in applications for which the linearity is important, and particularly in applications wherein it is sought to implement signal processing methods of the type described in the patents FR2914126 and FR2891362 mentioned above.

Figure 14:
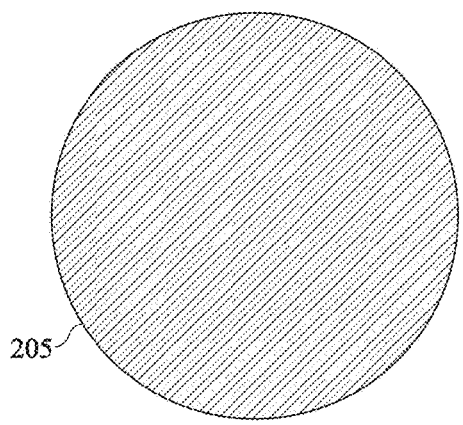
FIG. 14 is a front view representing an example of a field confinement part of an example of an embodiment of an inductive angular displacement sensor.
Figure 15:
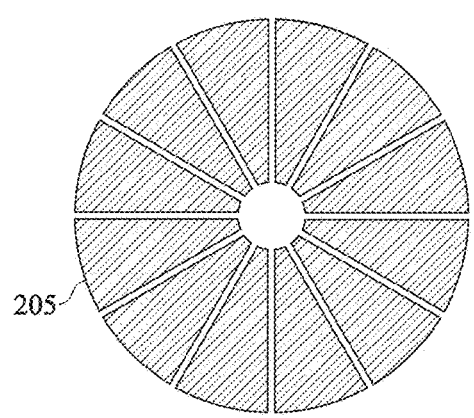
FIG. 15 is a front view representing a further example of a field confinement part of an example of an embodiment of an inductive angular displacement sensor.

FIGS. 14 and 15 are front views representing examples of field confinement parts 205 liable to be used in an inductive displacement sensor of the type described above (the parts 205' of the sensors mentioned above can have similar or identical configurations). In the example in FIG. 14, the part 205 is a mere disk made of a conductive material (for example metal) having a diameter for example greater than or equal to the outer diameter of the target. Alternatively (not shown), the disk can be drilled at the center thereof, for example with a hole less than or equal to the inner diameters of the conductive patterns of the target. In the example in FIG. 15, the part 205 is a disk of the same diameter but having cohesive radial striations or slots with the patterns of the target, suitable for obtaining a Moiré type structure effect with the target suitable for amplifying the influence of the part 205 on the field distribution at a secondary winding of the transducer. The embodiments described are, however, not restricted to these two particular examples.

Figures 16A, 16B:
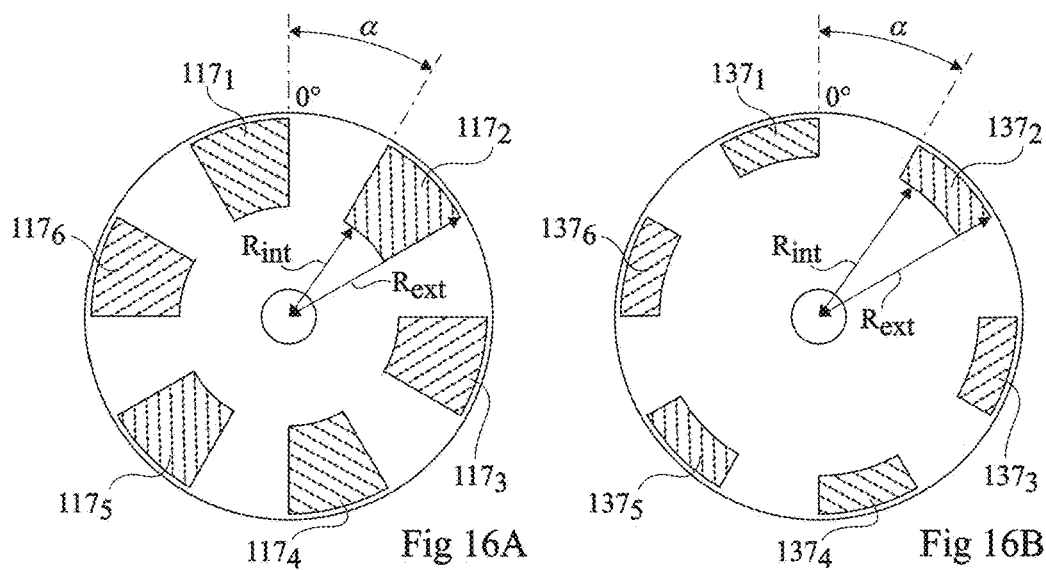
FIGS. 16A and 16B are front views schematically representing two examples of embodiments of a target of an inductive angular displacement sensor.
Figure 17:
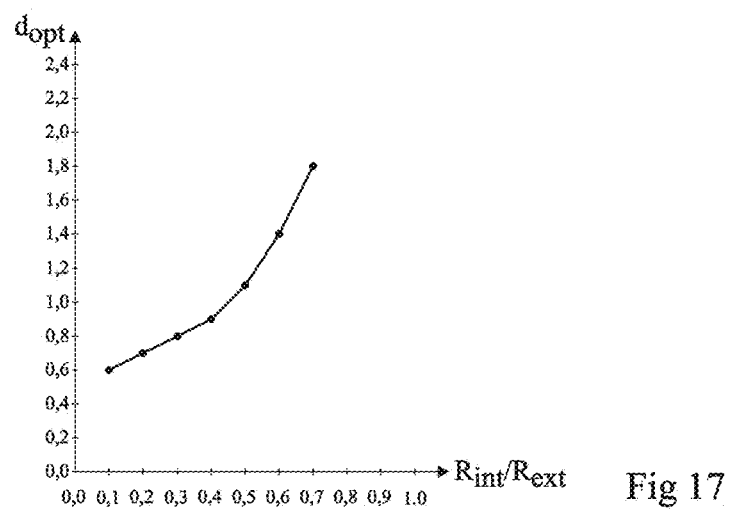
FIG. 17 is a diagram representing the progression, in an inductive angular displacement sensor, of the optimal target-distances in terms of linearity, according to a shape parameter of a pattern of the target.

A second solution for modifying the optimal target-transducer distance in terms of linearity, suitable for use in addition or as an alternative to adding a conductive field confinement part, is illustrated by FIGS. 16A, 16B and 17.

FIGS. 16A and 16B illustrate two examples of embodiments of an inductive angular position sensor. In FIGS. 16A and 16B, only the target of the sensor has been represented. The arrangement of the transducer, and particularly of the primary winding thereof or the secondary windings thereof, is consistent with the arrangement of the target, and can easily be deduced from the shape of the target on reading the above. In this example, the target of the sensor in FIG. 16A is similar or identical to the target in FIG. 3B. The target of the sensor in FIG. 16B also comprises N conductive patterns $137_i$ in the shape of an annular strip sector of angular aperture α approximately equal to one electrical half-period (for example 360°/2N), the N patterns $137_i$ being regularly distributed along an annular strip described by the target. The target in FIG. 16B differs from the target in FIG. 16A in that the conductive patterns $137_i$ have different radial dimensions (less in the example shown) from the radial dimensions of the conductive patterns $117_i$ of the target in FIG. 16A. More particularly, in this example, the annular strip determining the shape of the conductive patterns $137_i$ has an external radius $R_{ext}$ substantially identical to that of the annular strip determining the shape of the patterns $117_i$, but has an internal radius $R_{int}$ less than that of the annular strip of the conductive patterns $117_i$.

The inventors observed, as illustrated by FIG. 17, that, for a given number of pole pairs, the optimal target-transducer distance $d_{opt}$ in terms of linearity of the response of the sensor, varies according to the ratio $R_{int}/R_{ext}$ between the internal radius and the external radius of the annular strip wherein the conductive patterns of the target are situated, and consequently wherein the turns of the secondary winding(s) of the sensor are situated. It should be noted that the embodiment of FIG. 16B, which consists of varying the ratio $R_{int}/R_{ext}$ by modifying the internal radius $R_{int}$ of the conductive patterns of the target, is in no way exclusive of further embodiments suitable for varying the ratio $R_{int}/R_{ext}$ by modifying either the external radius $R_{ext}$, or both radii in combination.

FIG. 17 is a diagram representing the progression, for an inductive angular displacement sensor of the type described above, of the optimal target-transducer distance $d_{opt}$ in terms of linearity, according to the ratio $R_{int}/R_{ext}$. As seen in FIG. 17, the optimal target-transducer in terms of linearity increases as the ratio $R_{int}/R_{ext}$ increases. As such, for a given sensor configuration, the ratio $R_{int}/R_{ext}$ can be chosen such that the distance $d_{opt}$ is compatible with the constraints of the application, for example either greater than or equal to 0.3 mm, for example between 0.3 and 10 mm, and preferably between 0.5 and 1.5 mm, particularly for a sensor including a high number N of pole pairs, for example N≥4 and preferably N≥6.

In electromagnetic terms, it would appear that the modifications made to the internal and/or external radii of the target have the effect of modifying the conductive pattern shape ratio, and in particular modifying the contribution of the radial edges with respect to the contribution of the ortho-radial edges, this ratio of the contributions being a determining factor of the optimal target-transducer distance in terms of linearity $d_{opt}$. When the ratio $R_{int}/R_{ext}$ between the internal radius and the external radius of the target increases, the annular strip portion constituting a conductive pattern is compressed along the radial direction, inducing a reduction in the contribution of the radial edges to the overall field distribution measured by the secondary, conveyed at the secondary output signal by an increase in the optimal target-transducer distance in terms of linearity. The solution described therefore consists of modifying the spatial distribution of the electromagnetic field, and more particularly the ratio of the radial contributions with respect to the ortho-radial contributions, so as to adjust the optimal target-transducer distance in terms of linearity $d_{opt}$ so that it is compatible with the constraints of the application.

In the sensor in FIG. 16B, when the internal radius $R_{int}$ and/or the external radius $R_{ext}$ of the target in FIG. 16B change, the internal and external radii of the associated transducer change preferably substantially in the same proportions, so as to maximize the signal level received by the secondary. By maximizing the signal level at the secondary output, reference is more specifically made to maximizing the slope at the origin of the signal rather than maximizing the values adopted by the signal extrema for some positions.

For a given set of internal $R_{int}$ and external $R_{ext}$ target radii, the signal received by the secondary of the associated transducer is maximum when the annular strip defining the patterns of the target and the annular strip defining the patterns of the secondary are substantially overlaid, or in other words, when the external and respectively internal ortho-radial edges of the target and the external and respectively internal ortho-radial branches of the secondary are overlaid.

It should be noted that for a given sensor size (and particularly for an upper external radius limit and a lower internal radius limit), increasing the ratio $R_{int}/R_{ext}$ amounts to decreasing the surface area of the conductive patterns of the target, which induces a decrease in the amplitude of the variations of the sensor output signal level according to the position of the target with respect to the transducer. As such, in the prior art of inductive angular displacement measurement, the internal diameter and the external diameter of the annular strip wherein the conductive patterns of the target are situated, and consequently wherein the turns of the secondary winding(s) of the sensor are situated, are designed so as to occupy the maximum surface area available in the given size, the size being generally restricted by the internal aperture and the external diameter of the substrate and/or the casing wherein the sensor is integrated, or by the external diameter of the shaft about which the sensor is fitted and by the internal diameter of the interface parts between which the sensor is housed.

Nevertheless, the proposed solution consisting of modifying the ratio $R_{int}/R_{ext}$ defines a compromise which may be appropriate in applications for which linearity is important.

Figure 18A:
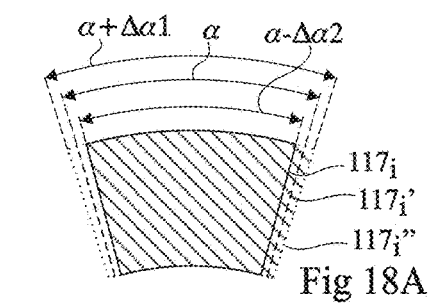
FIG. 18A is a front view schematically and partially representing three examples of embodiments of a target of an inductive angular displacement sensor.
Figure 18B:
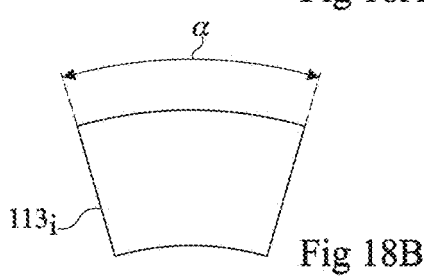
FIG. 18B is a front view schematically and partially representing an example of an embodiment of a secondary winding of a transducer suitable for operating in cooperation with the targets in FIG. 18A.
Figure 19:
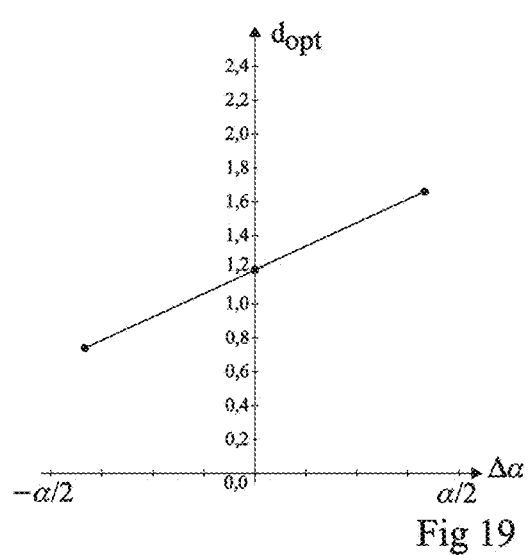
FIG. 19 is a diagram representing the progression, in an inductive angular displacement sensor, of the optimal target-transducer distance in terms of linearity, according to a further shape parameter of a pattern of the target.

A third solution for modifying the optimal target-transducer distance in terms of linearity, suitable for use in addition or as an alternative to adding an additional field confinement part, and/or to modifying the ratio $R_{int}/R_{ext}$, is illustrated by les FIGS. 18A, 18B and 19.

This third solution follows the same logic as the solution that has just been described, in that it consists of modifying the shape factor of the conductive patterns of the target and/or the corresponding secondary winding turns, and particularly of modifying the ratio between the radial dimension and the ortho-radial dimension of the patterns of the target and/or secondary winding turns, so as to adapt the optimal target-transducer distance in terms of linearity to the constraints of the application.

FIG. 18A illustrates three examples of embodiments of an angular position sensor of the type described above. In FIG. 18A, only one conductive pattern of the target, designated respectively by the references 117$_i$ for the first example (solid line), 117$_i'$ for the second example (dashed line), and 117$_i''$ for the third example (dotted line), has been shown. In each example, the target is obtained by regularly repeating the conductive pattern represented along a circular annular strip. The internal and external radii of the patterns 117$_i$, 117$_i'$, and 117$_i''$ are substantially identical, but the patterns 117$_i$, 117$_i'$, and 117$_i''$ differ from one another by the angular dimensions thereof. More particularly, in this example, the angular aperture of the pattern 117$_i'$ is approximately equal to one electrical half-period (for example 360°/2N), as described above, the angular aperture of the pattern 117$_i''$ is greater than one electrical half-period of a value $\Delta\alpha 1$, for example between 0% and 50% of an electrical half-period, and the angular aperture of the pattern 117$_i$ is less than 360°/2N of a value $\Delta\alpha 2$, for example between 0% and 50% of an electrical half-period.

As for the embodiment of the solution in FIGS. 16A, 16B and 17, the arrangement of the secondary of the transducer is preferentially consistent with the arrangement of the conductive patterns of the target, i.e. the angular aperture of the secondary patterns adapted to the patterns 117$_i'$ of the target is substantially equal to one electrical half-period (for example 360°/2N), the angular aperture of the secondary patterns adapted to the patterns 117$_i''$ of the target is greater than 360°/2N of a value substantially equal to $\Delta\alpha 1$, and the angular aperture of the secondary patterns adapted to the target 117$_i$ is less than 360°/2N of a value substantially equal to $\Delta\alpha 2$. In practice, when the angular aperture of the secondary patterns adopts a value greater than an electrical half-period of the sensor, it can be envisaged, in order to provide electrical insulation between adjacent turn tracks, to modify the shape of the tracks in at least one metallization plane, and/or to increase the number of metallization planes. A further embodiment option can consist of limiting the maximum angular aperture of the patterns of the secondaries to substantially one electrical half-period, and only varying the angular aperture of the patterns of the target (of the values $\Delta\alpha 1$ or $\Delta\alpha 2$). In this case, the angular aperture of the secondary winding patterns of the transducer is not strictly consistent with the angular aperture of the patterns of the target.

The inventors observed that the optimal target-transducer distance $d_{opt}$ in terms of linearity of the response of the sensor, varies according the angular deviation $\Delta\alpha$ between the angular aperture chosen for the patterns of the target and the secondary, and the nominal angular aperture $\alpha$ equal to one electrical half-period of the sensor.

FIG. 19 is a diagram representing the progression, for a given multi-pole angular displacement sensor of the type described above and illustrated in FIGS. 18A and 18B, of the optimal target-transducer distance $d_{opt}$ in terms of linearity, according to the value $\Delta\alpha$. As seen in FIG. 19, the optimal target-transducer distance in terms of linearity decreases as the value $\Delta\alpha$ increases for negative values, and conversely increases as the value $\Delta\alpha$ increases for positive values. As such, for a given sensor configuration, the angular aperture of the conductive patterns of the target can be modified by a value $\Delta\alpha$ with respect to the nominal value $\alpha$ (equal to one electrical half-period, for example 360°/2N), the value $\Delta\alpha$ being chosen such that the distance $d_{opt}$ is compatible with the constraints of the application, for example either greater than or equal to 0.3 mm, for example between 0.3 and 10 mm, and preferably between 0.5 and 1.5 mm, particularly for a sensor including a high number N of pole pairs, for example N≥4 and preferably N≥6.

Solutions have been described for reducing the linearity error (or increasing the extent of the linearity range) of the response of an inductive displacement sensor, as well as for modifying, i.e. increasing or reducing according the initial situation, the target-transducer distance for which an inductive displacement sensor has or approaches optimal characteristics in terms of linearity.

It should be noted that if the linearity error remains nonetheless excessively high (or if the extent of the linearity range obtained remains insufficient), one or a plurality of additional secondary windings, spatially offset (by a substantially equal angular offset between one another), may be added, so as to reduce the extent of the minimal linearity range required for proper reconstruction of the information in respect of positioning and/or displacement of the target, in combination with the application of the solutions described above. By way of illustrative example, in the sensor in FIG. 5, instead of providing two identical secondary windings spatially offset by a quarter of an electrical period, it is possible to envisage three identical secondary winding spatially offset by a sixth of the electrical period of the sensor.

Furthermore, it should be noted that the solutions described above can be adapted to inductive linear displacement sensors, for example by "unwinding" the patterns in circular strip form described above in order to convert same into patterns in rectilinear strip form.

Moreover, it should be noted that the solutions described above can be adapted to inductive angular displacement sensors wherein the transducer has an angular aperture less than 360°, for example less than 180° in order to enable assembly "from the side" of the transducer about a rotary shaft, rather than a "through" assembly. In this case, the angular aperture of the target can have a value of 360°, independent of the angular aperture of the transducers, or adopt a value less than 360°, corresponding for example to the angular displacement range of the application.

Second Aspect

The inventors further observed that, in practice, independently of the issue of linearity, existing inductive displacement sensors, and particularly multi-pole sensors, are sensitive to various disturbances induced by coupling effect. Such disturbances occur for example at the transduction zone, i.e. directly at the secondary of the transducer, and furthermore at the electrical connection zone between the secondary of the transducer and a functional conditioning block of the electronic means. These disturbances particularly feature the coupling of electromagnetic disturbances from outside the sensor (i.e. not generated by the primary winding), direct inductive coupling of the primary winding with the secondary winding (i.e. the proportion of inductive coupling remaining constant regardless of the position of the target), and/or capacitive coupling between the primary winding and the secondary winding. These disturbances can cause undesirable fluctuations of the sensor output signal(s) and sensor output signal interpretation errors.

It would be desirable to be able to avail of inductive displacement sensors, and particularly multi-pole sensors, less sensitive to parasitic disturbances and/or less subject to parasitic couplings than existing sensors.

As such, according to a second aspect, it is sought to reduce the sensitivity to disturbances and parasitic coupling effects of multi-pole inductive displacement sensors, and more particularly of the sensors of the type described with reference to FIG. 7, i.e. wherein the secondary winding(s) each comprise 2N turns of alternating winding directions, N being the number of pole pairs of the sensor. For this, the inventors propose a particular arrangement of the secondary winding(s) of the sensor, which will be described hereinafter.

Figure 20A:
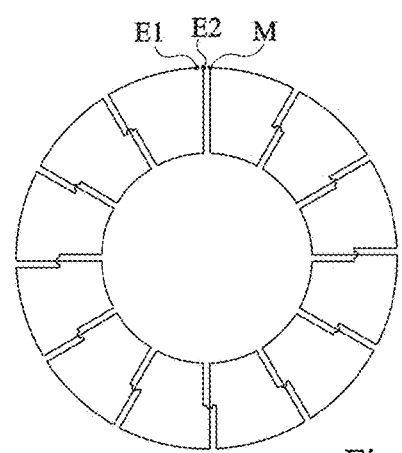
FIG. 20A is a front view schematically representing an example of a transducer of an inductive angular displacement sensor.
Figure 20C:
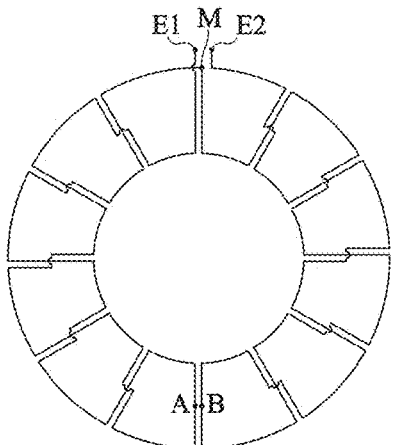
FIG. 20C is a front view schematically representing an example of an embodiment of a transducer of an inductive angular displacement sensor.

FIGS. 20A and 20C schematically illustrate two examples of embodiments of an inductive angular displacement sensor, of angular aperture 360°, consisting of N=6 pole pairs, and making a spatially differential measurement (for example as described with reference to FIG. 7). In FIGS. 20A and 20C, only one secondary 213 of each sensor has been shown, the embodiment of the primary winding, the target, and, optionally, one or a plurality of secondary windings spatially offset with respect to the winding 213, being within the grasp of those skilled in the art on the basis of the explanations in the present description. In this example, the secondary of the sensor in FIG. 20A and the secondary of the sensor in FIG. 20C are similar or identical to the secondary in FIG. 7, except that the electrical connections between the turns are shown. The secondary in FIG. 20A shows a first method for interconnecting the turns, whereby the entire angular aperture of the annular strip whereon the secondary extends is traversed a first time, for example in the trigonometric direction in the figure, and the entire annular strip is traversed a second time, this time in the clockwise direction, so as to approach the electrical terminal end E2 towards the electrical starting end E1, and thereby close the measurement circuit. The secondary in FIG. 20C shows a second method for interconnecting the turns, whereby a first half of the angular aperture of the annular strip whereon the secondary extends is first traversed, for example in the trigonometric direction in the figure, then the return path is traversed in the clockwise direction so as to approach the input end E1, then the other half of the angular aperture of the annular strip whereon the secondary extends is traversed, retaining the clockwise direction of rotation, and then the return path is traversed in the trigonometric direction so as to approach the electrical terminal end E2 towards the electrical starting end E1, and thereby close the measurement circuit as for the secondary in FIG. 20A.

Figure 20B:
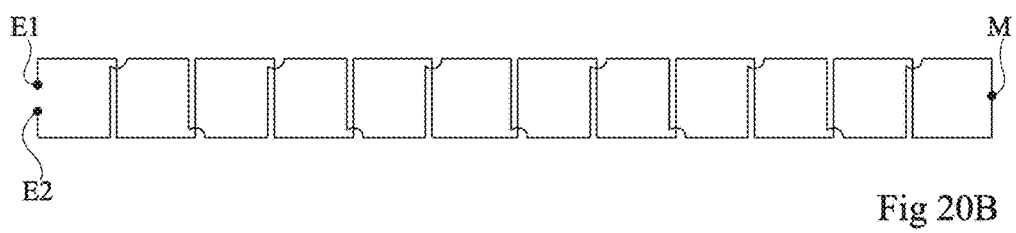
FIG. 20B is a front view schematically representing an example of a transducer of an inductive linear displacement sensor.
Figure 20D:
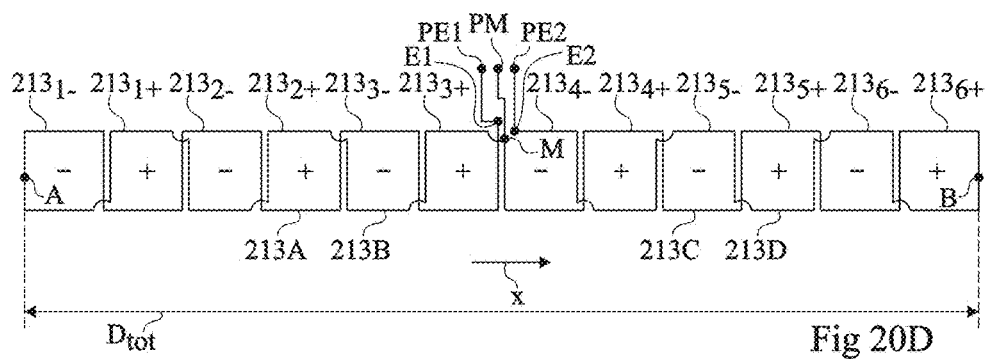
FIG. 20D is a front view schematically representing an example of an embodiment of a transducer of an inductive linear displacement sensor.

FIGS. 20B and 20D are front views schematically representing an example of an embodiment of a transducer of an inductive linear displacement transducer. The sensors in FIGS. 20B and 20D are sensors wherein a target (not shown) comprising N conductive patterns is suitable for moving in translation along a rectilinear direction x with respect to the transducer. The sensor in FIG. 20B is for example of the same type as the sensor in FIG. 20A, adapted to a linear configuration, which essentially consists of "unwinding" the circular annular strips of the sensor in FIG. 20A and replacing the conductive patterns and turns in the shape of an annular strip sector, by conductive patterns and turns having a general rectangular or square shape. The sensor in FIG. 20D is for example of the same type as the sensor in FIG. 20C, adapted to a linear configuration. In FIGS. 20B and 20D, only one secondary winding 213 of each sensor has been shown, the embodiment of the target, the primary winding, and, optionally, one or a plurality of additional secondary windings spatially offset with respect to the winding 213 being within the grasp of those skilled in the art on the basis of the explanations in the present description. By way of example and unlike the primary winding of the angular sensors in FIGS. 20A and 20C, an example of primary winding obtained when the set of two concentric turns 101a and 101b for example described for the sensor in FIG. 1A is "unwound", consists for example of a single turn for a linear sensor as described in FIGS. 20B and 20D, optionally consisting of a plurality of revolutions. The turn of the primary winding has for example a general rectangular shape, of dimension along y similar to the dimension along y of the conductive patterns of the target and/or of the turns of the secondary as described above, and of dimension along x greater than the dimension along x of the conductive patterns of the target and/or of the turns of the secondary, so that the contribution to the overall electromagnetic field distribution, created at the primary branches oriented along y and which are situated at both ends along x of the primary, are relatively attenuated in the vicinity of the secondary branches oriented along y and which are situated at both ends along x of the secondary. In particular, for a transducer with a single secondary winding, the range along x of the primary will be greater than the range along x of the secondary, and preferably but not exclusively, greater by at least one electrical half-period of the sensor, distributed equally (at one quarter of an electrical period) at each end of the sensor. As a general rule, a preferred example of embodiment of the primary winding of an inductive linear displacement sensor is a turn having a rectangular general shape and a range greater than the overall range of the set of secondaries, for example but not exclusively, greater by at least one electrical half-period of the sensor, distributed equally (at one quarter of an electrical period) at each end of the sensor.

In the examples in FIGS. 20B and 20D, the sensors comprise N=6 pole pairs. However, the embodiments described are not restricted to this particular case.

In the example of the sensor in FIG. 20D, the secondary winding 213 extends into a zone having a dimension $D_{tot}$ parallel with the degree of freedom of the sensor, i.e. parallel with the direction x of displacement of the target with respect to the transducer. The winding 213 comprises 2N loops or turns of alternating winding directions electrically connected in series between the ends E1 and E2 thereof. More particularly, the winding 213 comprises N loops or turns $213_{i+}$ having the same first winding direction, and N loops or turns $213_{i-}$ having the same second winding direction opposite the first direction, each turn $213_{i+}$ or $213_{i-}$ having a dimension along the direction x approximately equal to an electrical half-period of the sensor (i.e. for example approximately equal to $D_{tot}/2N$), and the turns $213_{i-}$ and $213_{i+}$ being juxtaposed in pairs in alternation along the zone of dimension $D_{tot}$ of the secondary winding.

According to a second embodiment, the secondary winding consists of:

a first coiled conductive section 213A forming N half-turns of alternating directions, extending between a first end E1 of the winding, situated approximately at the midpoint of the distance $D_{tot}$ along which the winding 213 extends parallel with the direction x, and a first intermediate point A of the winding, situated at a first end of the distance $D_{tot}$;

a second coiled conductive section 213B forming N half-turns of alternating directions, complementary to the N half-turns of the section 213A, extending between the point A and a second intermediate point M of the winding, approximately at the midpoint of the distance $D_{tot}$;

a third coiled conductive section 213C forming N half-turns of alternating directions, extending between the point M and a third intermediate point B of the winding, situated at the second end of the distance $D_{tot}$; and a fourth coiled conductive section 213D forming N half-turns of alternating directions, complementary to the N half-turns of the section 213C, extending between the point B and a second end E2 of the winding, situated approximately at the midpoint of the distance $D_{tot}$, in the vicinity of the first end E1 of the winding.

More particularly, in the example shown, in the left part of the winding (in the orientation of the figure), the section 213A comprises N U-shaped half-turns wherein the vertical branches are oriented in opposite directions along a direction y approximately normal to the direction x, and the section 213B comprises N U-shaped half-turns wherein the vertical branches are oriented alternately in opposite directions along the direction y. Each U-shaped half-turn of the section 213A has the vertical branches thereof approximately aligned with the vertical branches of a U-shaped half-turn of opposite orientation of the section 213B. The sections 213C and 213D are arranged according to a similar arrangement in the right part of the winding. As such, in this example, the portions of the winding 213 orthogonal to the direction of displacement x are traversed twice and twice only by the wire or track of the winding (except for the two orthogonal end portions of the winding situated at both ends of the distance $D_{tot}$, which, in this example, are traversed a single time—this exception does not arise however in the case of an angular sensor of angular aperture of 360°, wherein all the radial portions of the primary winding can be traversed twice and twice only by the wire or track of the winding), and the portions of the winding 213 parallel with the direction of displacement x are traversed once and once only by the wire or track of the winding.

In terms of path travelled by the constituent electrical circuit of the patterns of the secondary winding, the embodiment of the solution in FIG. 20D corresponds to the embodiment of a solution of the type described with reference to FIG. 20B, and by linear-angular transposition also corresponds to the embodiment of the solutions in FIGS. 20A and 20C. On the other hand, the sequence whereby this path is travelled differs between the transducer in FIG. 20D (and by transposition the transducer in FIG. 20C), and the transducer in FIG. 20B (and by transposition the transducer in FIG. 20A). In particular, the arrangement described with reference to FIGS. 20D and 20A is designed so as to show an intermediate connection point M between the ends E1 and E2.

The winding 213 can be provided, in addition to the connection terminals PE1 and PE2 at the ends E1 and E2 thereof, with a third access terminal PM connected to the midpoint M of the winding.

In the case of multi-pole sensors comprising an even number N of pole pairs, and as represented in FIG. 20D, the secondary winding has as many turns $213_{i+}$ (referred to as positive) on the right as turns $213_{i+}$ on the left (N/2 on each side), and consequently the secondary winding has as many turns $213_{i-}$ (referred to as negative) on the right as turns $213_{i-}$ on the left (N/2 on each side).

One advantage of the secondary winding arrangement in FIG. 20D when the number of pole pairs adopts an even value, lies in that the induction is substantially identical, to the nearest sign, regardless of the position of the target with respect to the transducer, on the two portions E1-M and E2-M on either side of the midpoint, while enabling the three connections E1, E2 and M to be situated adjacent to one another.

This preferred embodiment wherein the number of pole pairs adopts even values is in no way exclusive of other embodiments. Alternatively, if the number N of pole pairs is high, the choice of an odd number N is perfectly acceptable insofar as the error of signal symmetry between the portion E1-M and the portion E2-M varies as an inverse function of N.

The inventors observed that when the sensor is embodied according to the second embodiment, if the midpoint M of the winding is referenced at a given electric potential of the differential measurement means, for example at a constant potential centered on the voltage measurement range of the measurement means, the common mode component contained in the electrical signal present at the terminals of the dipole E1-E2, which does not carry useful information on the position and the displacement of the target with respect to the transducer, is low with respect to the differential mode component contained in the same electrical signal present at the terminals of the dipole E1-E2, the differential mode component carrying however, the useful information on the displacement of the target with respect to the transducer. The arrangement of the sensor in FIGS. 20C and 20D suitable for positioning the midpoint M in the immediate vicinity of the ends E1 and E2 therefore has a definite advantage, for example with respect to the arrangement of the sensor in FIG. 20B wherein the midpoint M is removed from the ends E1 and E2, and more generally with respect to the arrangement of the sensors in FIGS. 20A and 20B wherein the values E1-M and E2-M are dependent on the position of the target with respect to the transducer, or, in other words, with respect to the sensor arrangements wherein the ratio of the common mode component over the differential mode component at the terminals of a secondary winding is not low and varies significantly with the position of the target with respect to the transducer.

In particular, one advantage of the sensors described in FIGS. 20C and 20D when the midpoint M is suitably connected to the measurement means, lies in high immunity of the two electric potentials at the ends E1 and E2, to the component of the electromagnetic excitation field (primary) which does not vary with the position, whereas the spatially differential nature of the measurement of the sensor in FIG. 7 only guarantees immunity on the difference in potential at the ends E1 and E2.

In addition to the immunity to the "direct" field emitted by the primary (internal source of the system), the sensors in FIGS. 20C and 20D also offer increased immunity to electromagnetic and/or electrostatic disturbances emitted by an external source at the transduction zone and wherein the spatial distribution is relatively homogeneous, or more generally increased immunity to any form of electromagnetic and/or electrostatic disturbance with respect to sensors as described in FIGS. 20A and 20B.

Examples of practical examples of increased immunity to external disturbances in the transduction zone are for example the reduction of constraints on electronic measurement means protections, such as voltage surge protections, and/or the relaxation of design constraints on electrical signal conditioning systems, such as the common mode rejection rate of differential amplifiers.

It should be noted that adapting an inductive sensor to apply a midpoint according to the second embodiment can give rise to an increase in the number of interfaces of the conditioning circuit (for example the number of tabs of an integrated circuit). It should particularly be noted that according to the prior art of inductive measurement, it tends to be conventional to minimize the number of physical interfaces by substituting same with electronic or digital processing. However, this second embodiment makes it possible to achieve a relatively simple electronic solution, of high immunity and measurement robustness levels than with known solutions.

Figure 20E:
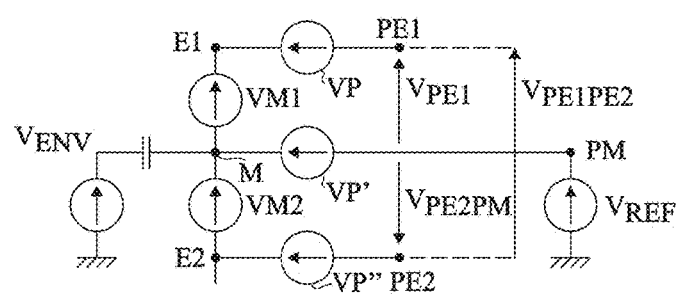
FIG. 20E is a small-signal electrical representation of the behavior of the transducer in FIG. 20D.

FIG. 20E is a "small signal" electrical representation of the effective induction phenomena $V_{M1}$ and $V_{M2}$, i.e. of the signals carrying the information or a portion of the information on the position and/or displacement of the target with respect to the transducer, and parasitic induction phenomena $V_P$, $V_P'$, et $V_P''$ at the connection wires between the terminals E1, E2 and M of the transducer, and the terminals PE1, PE2 and PM for example connected at the external electrical means. In this figure, and inasmuch as the wires connected from E1, E2 and M follow each other in close succession, the common mode disturbances $V_P$, $V_P'$, and $V_P''$ are substantially equal and are substantially offset in the measurements $V_{PE1}$ (made at the terminals of the dipole PM-PE1) and $V_{PE2}$ (made at the terminals of the dipole PM-PE2) on one hand, and in the measurement $V_{PE1PE2}$ made at the terminals of the dipole PE1-PE2 on the other. Once the potential of the terminal PM set to a known value $V_{REF}$, the signals measured at the terminals of the tripole (PE1, PE2, PM) become extremely immunized to external electromagnetic interference in the connection zone between the terminals of the transducer (E1, E2, M) and the connection terminals for the external electrical means (PE1, PE2, PM), firstly by limiting the risks of overvoltage on the inputs of the electrical means (the signal levels remain within the range of the conditioning means, and the measurement is unconditionally valid), and secondly by relaxing requirements on the common mode rejection rate of the differential measurement $V_{PE1PE2}$ (the measurement error introduced by the disturbances is low). For example, it is possible to apply to the terminal PM a reference voltage of the conditioning block, or half the power supply range of the conditioning block, or the electronic ground, without these embodiments being exclusive of other embodiments such as for example the connection of the terminal PM or M directly to a potential of the transducer such as the ground.

A representative signal of the position of the target with respect to the transducer is thereby obtained, particularly robust to disturbances and/or to parasitic coupling effects, whether they occur at the transduction zone or the connection zone between the transducer and external electrical means, and whether they are inductive in nature as shown in the electrical diagram in FIG. 20E, or capacitive in nature with the electrical environment of the transducer and/or the primary winding or in particular the portions close to the hot spot of the primary (high voltage).

Moreover, in the case where the transducer comprises a plurality of spatially offset secondary windings (for example as described with reference to FIG. 5), the various windings can be arranged in and/or on various overlaid support layers each comprising one a plurality of metallization levels. This configuration, though satisfactory for many applications, can however pose problems in respect of robustness and precision. Indeed, as a result, the median planes of the various secondary windings are situated at slightly different distances from the primary winding and the target. This results in particular, firstly, in a difference in transduction gain, and therefore a difference in output signal level of the various secondary windings, and secondly in different linearity characteristics between a plurality of secondary windings of the same transducer.

To solve this problem, it is preferably envisaged, as illustrated by FIGS. 21A, 21B, 22A and 22B by way of non-restrictive example, to distribute the various secondary windings of the transducer into two metallization levels, for example in the same support layer with two metallization levels, such that, for each winding, the length of track or wire of the winding arranged in the first metallization level is approximately equal to the length of track or wire of the winding arranged in the second metallization level. Preferably, a sustained alternation of the changes of metallization plane is envisaged, such that a secondary track cannot travel, on the same plane, a distance (for example an angular aperture in the case of an angular sensor) greater than an electrical half-period. In a preferred embodiment, the metallization plane transition zones are located such that there is a symmetric and/or anti-symmetric relationship between most of the track portions arranged on the first metallization level, and most of the track portions arranged on the second metallization level, as illustrated in FIGS. 21A, 21B, 22A and 22B.

As such, the median planes of the various secondary windings are merged and correspond to a virtual intermediate plane situated between the first and second metallization levels. This gives each electromotive force induced at the terminals of each secondary, a response according to the position of the target substantially identical in terms of amplitude and linearity, to that of the electromotive forces induced at the terminals of the other secondaries.

It should be noted that the examples of embodiments shown in FIGS. 21A, 21B, 22A and 22B correspond to sensors of angular range $D_{tot}=360°$, i.e. wherein the angular range occupied by each secondary has an angular aperture substantially equal to a complete revolution. These examples are exclusive of alternative embodiments involving sensors of angular aperture strictly less than 360°, for example less than 180° in order to enable assembly "from the side" of the transducer about a rotary shaft, rather than a "through" assembly of the sensor about said shaft in the case of a sensor of angular aperture 360° as described in FIGS. 21A, 21B, 22A and 22B for example. Under these conditions, it is reiterated moreover that the angular aperture of the target can alternatively retain a value of 360° independently of the angular aperture adopted by the secondary/secondaries of the transducer, or adopt a value less than 360° and for example adapted to the angular displacement range of the application.

Figure 21A:
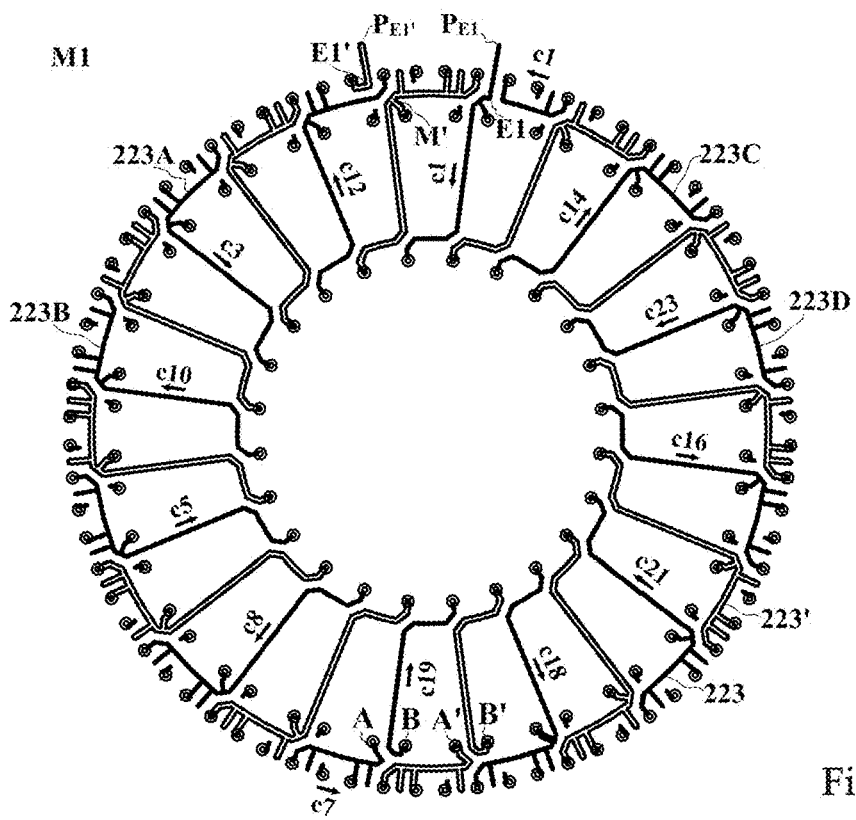
FIGS. 21A and 21B are front views schematically representing an example of an embodiment of a transducer of an inductive angular displacement sensor.
Figure 21B:
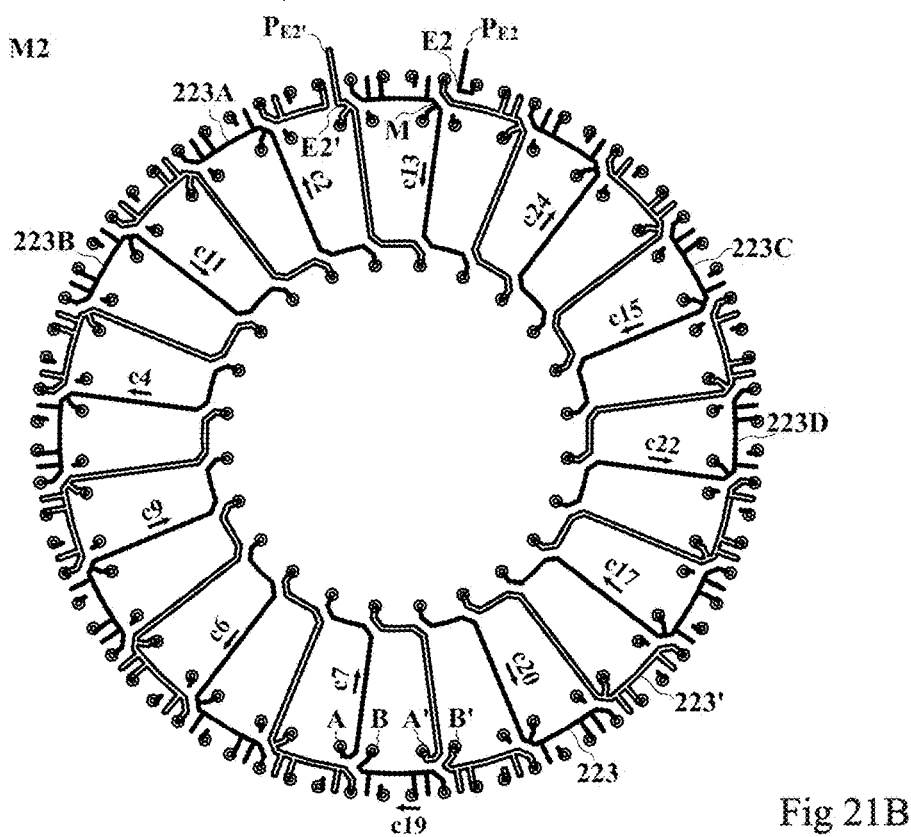

FIGS. 21A and 21B are front views schematically representing an example of an embodiment of a transducer with two secondary windings 223 (hollow line) and 223' (solid line) spatially offset by a quarter of an electrical period, for an inductive angular displacement sensor. In the example shown, the number N of pole pairs of the sensor is equal to 6, and each secondary winding 223, 223' comprises 2N=12 loops or turns. The embodiments described are not however restricted to this specific case. In this example, the two secondary windings 223 and 223' are formed in and on the same substrate with two metallization levels M1 and M2 connected by conductive vias (schematically represented by circles). For each winding, the length of track formed in the level M1 is approximately equal to the length of track formed in level M2. FIG. 21A is a front view of the metallization level M1, and FIG. 21B is a front view of the metallization level M2. The patterns of the level M1 are substantially found on the basis of the patterns of the level M2 by antisymmetry with respect to an intermediate plane between the median planes of the levels M1 and M2.

The windings 223 and 223' each have, viewed from above, an arrangement of the type described with reference to FIG. 20C (i.e. an arrangement of the type described with reference to FIG. 20D adapted to an angular configuration, the coiling principle described with reference to FIG. 20D applying in a similar manner, the distance $D_{tot}$ no longer being a linear distance but now being an angular distance, equal to 360°).

As such, the winding 223 comprises:

a first curved coiled conductive section 223A forming N half-turns of alternating directions, extending along a first circular annular half-strip in the example shown between a first end E1 of the winding 223, situated approximately at the midpoint of the distance $D_{tot}$ (for example in the vicinity—i.e. within 5° and preferably with 2°—of an angular position to which the value 0° is arbitrarily assigned), and an intermediate point A of the winding, situated at a first end of the distance $D_{tot}$ (for example in the vicinity of the angle 180°);

a second curved coiled conductive section 223B forming N half-turns of alternating directions, complementary to the N half-turns of the section 223A, extending along the first annular half-strip between the point A and a second intermediate point M of the winding, situated approximately at the midpoint of the distance $D_{tot}$ (for example in the vicinity of the angle 0°);

a third curved coiled conductive section 223C forming N half-turns of alternating directions, extending along a second annular half-strip complementary with the first half-strip between the point M and a third intermediate point B of the winding, situated at an opposite end of the distance $D_{tot}$ (for example in the vicinity of the angle–180°); and a fourth curved coiled conductive section 223D forming N half-turns of alternating directions, complementary to the N half-turns of the section 223C, extending along the second annular half-strip between the point B and a second end E2 of the winding, situated approximately at the midpoint of the distance $D_{tot}$ (in this example in the vicinity of the angle 0°).

As seen in FIGS. 21A and 21B, in this (non-restrictive) example, the portions of the winding 223 orthogonal to the direction of displacement of the target with respect to the sensor, i.e. the radial branches of the winding, are traversed twice and twice only by the wire or track of the winding, and the portions of the winding 223 parallel with the direction of displacement of the target with respect to the sensor, i.e. the ortho-radial branches of the winding, are traversed once and once only by the wire or track of the winding.

More particularly, in this example: the radial portions positioned at angles offset by 0° modulo an electrical half-period, with respect to the angle characterizing the end E1, are traversed twice and twice only by the wire or track of the winding 223; the radial portions positioned at angles offset by a quarter of an electrical period modulo an electrical half-period, with respect to the angle characterizing the end E1, are traversed twice and twice only by the wire or track of the winding 223'; and the ortho-radial portions are traversed once and once only by the wire or track of the winding 223, and once and once only by the wire or track of the winding 223'.

This embodiment makes it possible to contain over two planes and only two metallization planes, two secondaries as described in the preceding solutions, i.e. without making any concession on the overall shape of the patterns of each secondary. It should be noted that the embodiments shown in FIGS. 21A, 21B, 22A and 22B implement two secondaries arranged over two metallization planes, but are in no way exclusive of further embodiments such as an embodiment implementing for example three secondaries arranged over three metallization planes.

In this example, each of the U-shaped half-turns of each of the sections 223A, 223B, 223C and 223D of the winding 223 (hollowed line) has approximately half of the length thereof in the metallization level M1 and the other half of the length thereof in the metallization level M2. A change of level occurs approximately every L/2 meters of conductive track, where L denotes the length of a turn of the winding, consisting of the connection in series of two complementary U-shaped half-turns. In the example shown, the level change points of the winding are situated at the midpoints of the ortho-radial branches (or horizontal branches) of the U shapes forming the half-turns. However, the embodiments described are not restricted to this specific case. In FIGS. 21A and 21B, the numbers ranging from c1 to c28 denote, in the order of travel between the terminals E1 and E2, different portions of the winding 223.

The secondary winding 223' (solid line) is arranged in the levels M1 and M2 according to an arrangement substantially identical to that of the winding 223, but with an angular offset of approximately a quarter of an electrical period (i.e. 15° in this example) with respect to the winding 223.

It should be noted that in the structure in FIGS. 21A and 21B, the connection tracks to the ends E1 and E2 of the winding 223 can for example be situated respectively in the metallization levels M1 and M2, and be overlaid on one another. This makes it possible to minimize the parasitic coupling difference on each of these branches with any source of external induction (connection track to the primary, external electromagnetic disturbance, etc.). An access track to the midpoint M of the winding can be situated in a third metallization level (not shown), overlaid on the access tracks to the terminals E1 and E2 which are situated in the metallization levels M1 and/or M2, to be situated in one of the metallization levels M1 and M2, slightly offset with respect to the access tracks to the terminals E1 and E2. A similar arrangement of the access tracks to the corresponding terminals E1', E2' and M' of the winding can be envisaged for the winding 223'. More generally, regardless of the arrangement of the access tracks, so as to increase the immunity to electromagnetic disturbances between the transduction zone (secondary) and the access and/or connection terminals to the signal conditioning means, it is preferably sought to keep the paths from the ends E1 and E2 as close as possible (for example overlaid in PCB technology), and to a lesser degree position the path from the intermediate point M relatively close to the paths from the ends E1 and E2.

It should be noted further that, in the example in FIGS. 21A and 21B, besides the vias making changes in metallization levels of the windings 223 and 223', and the conductive tracks travelling in each metallization level for field pickup purposes, vias or conductive filling chips, with no electrical connection function between field pickup tracks, have been regularly distributed along the windings 223 and 223'. These conductive filling patterns have the role of symmetrizing the conductive structure of the transducer, so as to periodize the influence thereof on the spatial distribution of the field, and more particularly of minimizing the field distribution singularities which would be conveyed by a variation of the secondary output signal according to the position. The addition of these conductive filling patterns is however optional. In particular, if the vias making the changes of metallization level have small dimensions with respect to the skin thickness, the operating frequency, the constituent material thereof, it is possible to envisage not adding the conductive chips and in particular not performing the drilling thereof, which can reduce the cost of the device.

Figure 22A:
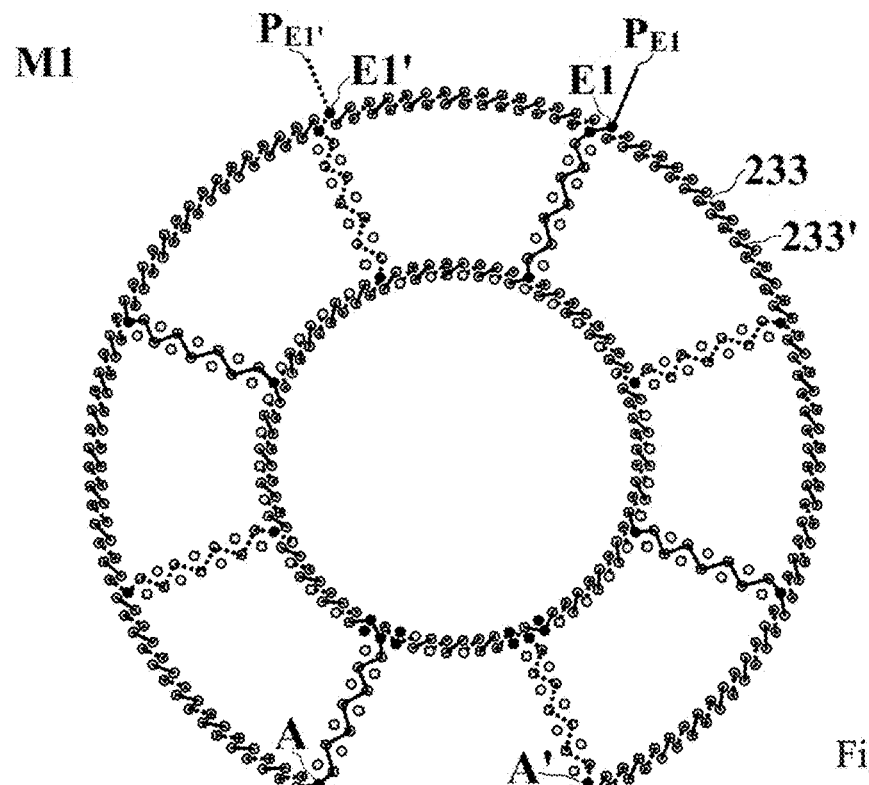
FIGS. 22A and 22B are front views schematically representing a further example of an embodiment of a transducer of an inductive angular displacement sensor.
Figure 22B:
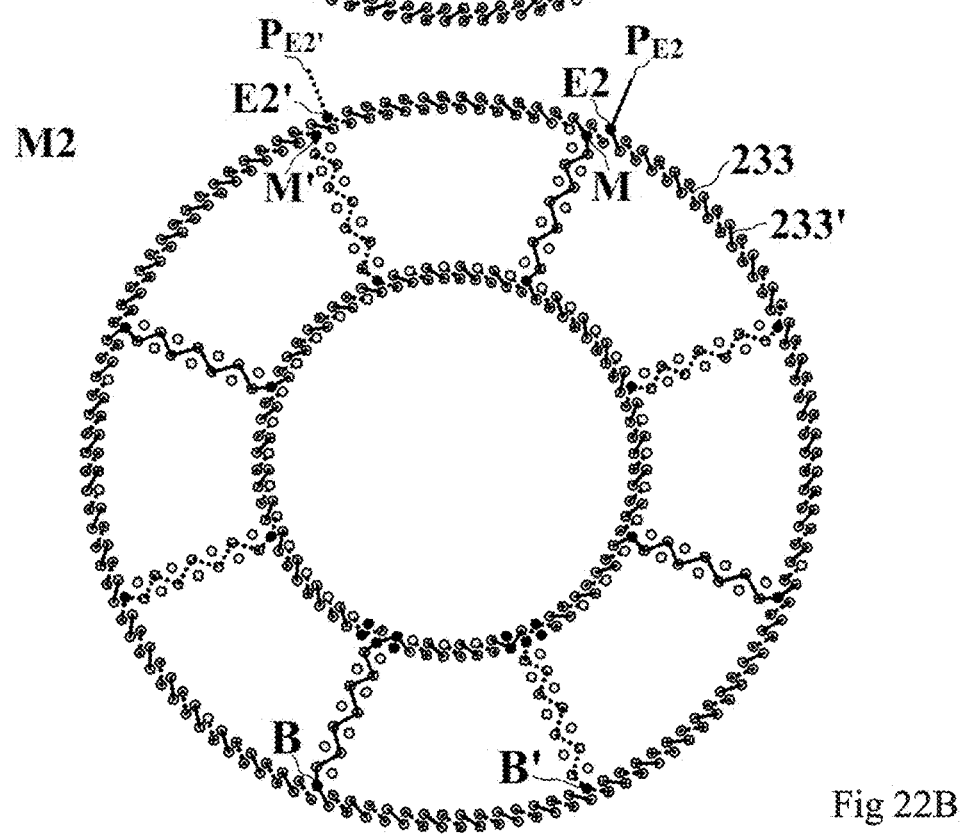

FIGS. 22A and 22B are front views schematically representing an alternative embodiment of a transducer of the type described with reference to FIGS. 21A and 21B. This alternative embodiment differs from the example in FIGS. 21A and 21B in that, in the example in FIGS. 22A and 22B, the changes of metallization level are more numerous than in the example in FIGS. 21A and 21B. As such, in the example in FIGS. 22A and 22B, instead of a change of metallization level every L/2 meters of conductive track of the secondary winding, where L is the length of a turn of the winding, it is envisaged to make k changes of metallization level every L/2 meters of track, where k is an integer greater than or equal to 2. The number k can be chosen accounting for the internal and external radii of the transducer. By way of non-restrictive example, for given sensor sizes and when the changes of level are made only in the ortho-radial portions of the turns, k can be chosen as great as it possible to place adjacent (for example equi-distributed) vias over other-radial portions without these vias short-circuiting. For the purposes of simplification, FIGS. 22A and 22B show an example of an embodiment for a sensor with N=2 pole pairs, wherein the transducer comprises 2 secondary windings 233 (dashed line) and 233' (solid line) angularly offset by a quarter of the electrical period of the sensor (i.e. 360°/4N=45° in this example). The alternative embodiment in FIGS. 22A and 22B is however compatible with sensors comprising a greater number of pole pairs. As in the example in FIGS. 21A and 21B, conductive filling patterns with no electrical connection function can be envisaged to symmetries the structure further.

Third Aspect

In the examples of embodiments of multi-pole sensors hitherto described, for a given dimension $D_{tot}$ of a secondary winding of the transducer parallel with the degree of freedom of the target with respect to the sensor, and for a given number N of pole pairs, the maximum extent of the range of positions suitable for being detected by the sensor is approximately one electrical half-period (for example $D_{tot}/2N$ i.e. 360°/2N in the case of an angular sensor) if the sensor comprises a single secondary winding, and can increase to approximately one electrical period (for example $D_{tot}/N$ i.e. 360°/N in the case of an angular sensor) if the sensor comprises more than one secondary winding, for example if it comprises two identical secondary windings spatially offset by a quarter of an electrical period (for example $D_{tot}/4N$, i.e. 360°/4N in the case of an angular sensor), or if it comprises three identical secondary windings spatially offset by a sixth of an electrical period (for example $D_{tot}/6N$, i.e. 360°/6N in the case of an angular sensor). In any case, the multi-pole angular displacement sensors of the type described above do not make it possible to make displacement measurements over a complete revolution (360°) absolutely, i.e. without using displacement log memorization methods, and/or methods for referencing the position at start-up and/or during the operation of the sensor. This remark is valid regardless of the number N of pole pairs greater than or equal to 2, and can be more problematic when the number N is high, for example N≥4 and preferably N≥6. The inductive linear displacement sensors described above have the same limitations and do not make it possible to make a measurement over the complete range of $D_{tot}$ absolutely.

According to a third aspect, it is sought to embody an inductive displacement sensor such that, for a given number N of pole pairs, for a given dimension $D_{tot}$ of the secondary winding(s) of the transducer parallel with the degree of freedom of the sensor, the sensor is suitable for detecting the position of the target with respect to the transducer substantially over the entire range $D_{tot}$ of the transducer. In particular, in the case of an angular position sensor, it is sought to embody a sensor suitable for detecting the position of the target with respect to the transducer over a complete revolution, i.e. over an angular range of approximately 360°, even when the number N of the pole pairs of the sensor is high, for example N≥4 and preferably N≥6.

Figure 23:
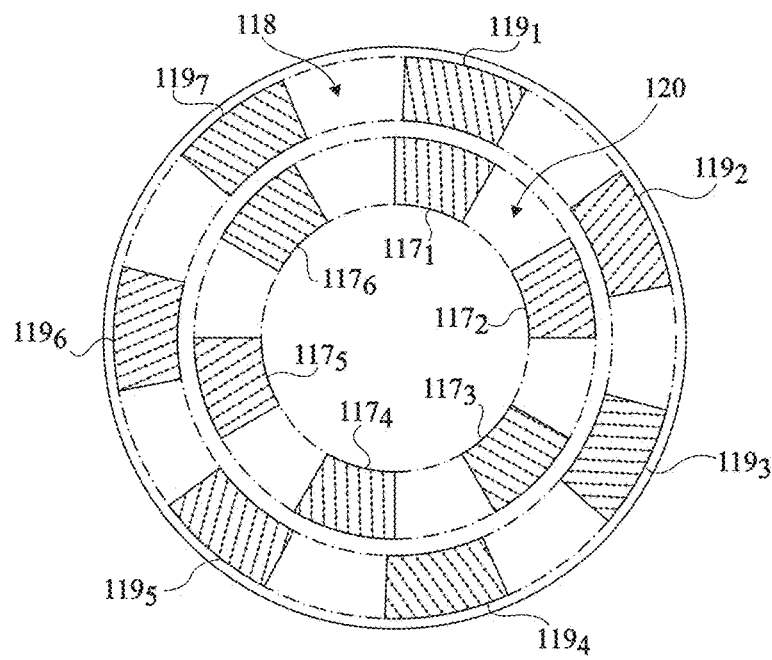
FIG. 23 is a front view schematically representing a target of an example of inductive angular displacement sensor.

FIG. 23 is a front view schematically representing an example of a multi-pole inductive angular displacement sensor. In FIG. 23, only the target of the sensor has been shown.

The target of the sensor in FIG. 23 comprises, as in the example in FIG. 3B, N conductive patterns $117_i$ (N=6 in the example shown) regularly distributed along the 360° of a first circular annular strip 118 of the target. Each conductive pattern $117_i$ has the shape of a portion or of a sector of the first annular strip 118, of angular aperture $\alpha_N$ approximately equal to $D_{tot}/2N=360°/2N$, two consecutive patterns $117_i$ being separated by a sector of the first annular strip 118, substantially of the same angular aperture $\alpha_N$. The target of the sensor in FIG. 23 further comprises N+1 conductive patterns $119_j$, where j is an integer ranging from 1 to N+1, regularly distributed along the 360° of a second circular annular strip 120 of the target, concentric with the first strip 118 and not overlaid with the first strip 118. In the example shown, the second annular strip has an internal radius greater than the external radius of the first annular strip. Each conductive pattern $119_j$ has the shape of a sector of the second annular strip 120, of angular aperture $\alpha_{N+1}$ approximately equal $D_{tot}/2(N+1)=360°/2(N+1)$, two consecutive conductive patterns $119_j$ being separated by a sector of the second annular strip 120, substantially having the same angle $\alpha_{N+1}$.

The transducer (not shown for simplification purposes) of the sensor in FIG. 23 corresponds with the target shown, i.e. it comprises:

one or a plurality of primary windings suitable for producing a magnetic excitation in first and second circular annular strips of the transducer substantially identical to the first and second annular strips 118 and 120 of the target, intended to be positioned respectively facing the first and second annular strips 118 and 120 of the target;

at least first and second secondary windings of electrical period $D_{tot}/N$ (for example 360°/N in the example of an angular sensor), each comprising N turns of the same winding direction, in the shape of sectors of angular aperture $\alpha_N$ of the first annular strip of the transducer, regularly distributed along the first annular strip of the transducer, or, alternatively, comprising 2N turns of alternating winding directions in the shape of sectors of angular aperture $\alpha_N$ of the first annular strip of the transducer, regularly distributed along the first annular strip of the transducer; and at least third and fourth secondary windings of electrical period $D_{tot}/(N+1)$ (for example 360°/(N+1)), each comprising N+1 turns of the same winding direction in the shape of sectors of angular aperture $\alpha_{N+1}$ of the second annular strip of the transducer, regularly distributed along the second annular strip of the transducer, or, alternatively, comprising 2(N+1) turns of alternating winding directions in the shape of the sectors of angular aperture $\alpha_{N+1}$ of the second annular strip of the transducer, regularly distributed along the second annular strip of the transducer.

Preferably, in the first annular strip, the second secondary winding of electrical period $D_{tot}/N$ is substantially identical to the first winding and spatially offset by a quarter of an electrical period ($D_{tot}/4N$) with respect to the first winding, and, in the second annular strip, the fourth secondary winding of electrical period $D_{tot}/(N+1)$ is substantially identical to the third winding and spatially offset by a quarter of an electrical period ($D_{tot}/4(N+1)$) with respect to the second winding. More generally, the transducer can comprise, in the first annular strip, a plurality of secondary windings of electrical period $D_{tot}/N$, substantially identical to the first winding and spatially offset with respect to one another by a certain electrical period percentage, and, in the second annular strip, a plurality of secondary windings of electrical period $D_{tot}/(N+1)$, substantially identical to the third winding and spatially offset with respect to one another by a certain electrical period percentage.

The operation of the sensor in FIG. 23 will now be described with reference to FIG. 24. The (non-restrictive) case is taken into consideration where the transducer of the sensor comprises, in the first annular strip of the transducer, a first pair of identical secondary windings of electrical period 360°/2N, spatially offset by a quarter of an electrical period, and, in the second pair of identical secondary windings of electrical period 360°/2(N+1), spatially offset by a quarter of an electrical period. As described above, this sensor is suitable for supplying two sets of two separate electromotive forces, from which it is possible to construct an estimation of position respectively over a position range equal to 360°/2N and over a position range equal to 360°/2(N+1).

Figure 24:
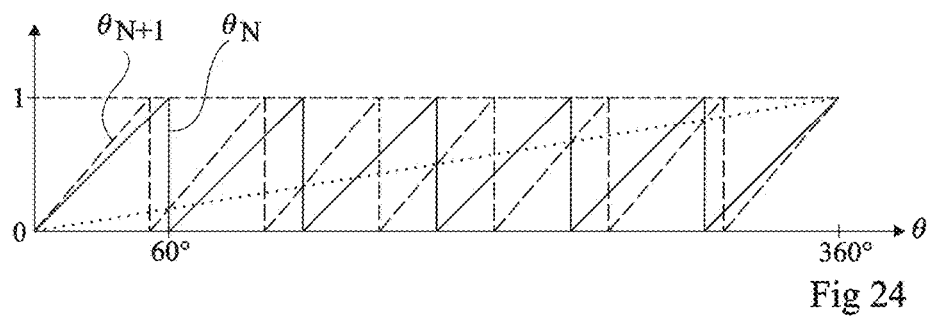
FIG. 24 is a diagram schematically representing the progression of measurement signals of the sensor in FIG. 23.

FIG. 24 is a diagram representing the progression, according to the position of the target with respect to the transducer, of the estimation $\theta_N$ (solid line) of the position obtained using the electromotive forces measured at the terminals of the first pair of secondary windings, and of the estimation $\theta_{N+1}$ (dashed lines) of the position obtained using the electromotive forces measured at the terminals of the second pair of secondary windings of the transducer.

As seen in FIG. 24, when the angular position $\theta$ of the target with respect to the transducer varies from 0° to 360°, the position estimation signal $\theta_N$ varies periodically between a low value substantially equal to 0 and a high value substantially equal to 1 (the position estimations are standardized herein for the purpose of simplification, the embodiments described not being restricted to this particular case), with a variation period equal to the electrical period of the first pair of secondary windings, i.e. equal to 360°/N=60° for N=6. Furthermore, the position estimation signal $\theta_{N+1}$ varies periodically between the low 0 and high values 1, with a variation period equal to the electrical period of the second pair of secondary windings, i.e. equal to 360°/N+1≈51.4° for N=6.

By combining the levels of the position estimation signals $\theta_N$ and $\theta_{N+1}$, two separate measurement scales are obtained over a complete sensor revolution, i.e. two different splits of the same range of 360°. The principle of a vernier applied to these two angular measurement scale, i.e. the construction of the difference $\theta_{N+1}-\theta_N$ between the two standardized position estimations $\theta_{N+1}$ and $\theta_N$, is suitable for estimating the position and/or the displacement of the target relative to the transducer over the entire distance $D_{tot}=360°$ (i.e. over a complete revolution).

More particularly, one of the position estimation signals, for example the signal $\theta_N$, can be used to provide "refined" target displacement information in N angular ranges restricted to the electrical period 360°/N, and the difference $\theta_{N+1}-\theta_N$ between the other position estimation signal (the signal $\theta_{N+1}$ in this example) and this signal can be used to provide rough absolute information of the position of the target over a complete revolution. Under these conditions, the rough absolute information makes it possible to adapt the refined but angularly restricted information, so as to carry out an absolute and refined displacement estimation over 360°.

One advantage of the sensor in FIG. 23 is that it makes it possible to benefit to a certain degree of the advantages of multi-pole sensors, particularly in terms of robustness to positioning errors, while being suitable for providing measurements over an extended position range with respect to the multi-pole sensors of the type described above.

As a general rule, it should be noted that the embodiment described above can be adapted to two signals $\theta_{N1}$ and $\theta_{N2}$, N1 and N2 being different integers not necessarily exhibiting a unitary difference. Under these conditions, a sensor characterized by N1 and N2=N1+2, exhibiting a similar arrangement to the arrangement of the sensor in FIG. 23, is suitable for extending the absolute measurement over a range $D_{tot}/N=180°$. As a general rule, a sensor characterized by N1 and N2=N1+r, where r is a positive integer strictly less than N1, makes it possible under certain conditions to extend the absolute measurement over a range $D_{tot}/k=360°/r$.

In this general case, r is obviously a strictly positive integer, i.e. different to zero (or greater than or equal to 1), such that N2 is greater than or equal to N1+1. If r was not strictly positive, N2 could be equal to N1 if r=0, and the two signals $\theta_{N1}$ and $\theta_{N2}$ would be identical (not distinct) and would not be suitable for estimating the absolute position by the difference between the two standardized position estimations, as explained above.

Furthermore, r is an integer less than or equal to N1−1, such that N2 is less than or equal to 2N1−1. If N2 could be equal to 2N1, the difference between the two standardized position estimations, as described above, would furnish information similar to that furnished solely by the first set of patterns (corresponding to N1), and would not be suitable for better estimating the absolute difference by the two standardized position estimations. As such, once r is less than or equal to N1−1, the embodiments and advantages of the invention are applicable.

In practice, r has a preferably low value, for example r is equal to 1 as described above and illustrated in FIG. 23. This makes it possible to make an absolute measurement over the greatest range, 360°. In some applications, it can be preferable to choose a value of r equal to 2 (absolute measurement over 180° when $D_{tot}$=360°), or choose a value of r equal to 3 (absolute measurement over 120° when $D_{tot}$=360°), or choose a value of r equal to 4 (absolute measurement over 90° when $D_{tot}$=360°), or choose a value of r equal to 5 (absolute measurement over 72° when $D_{tot}$=360°), etc.

The sensor in FIG. 23 poses a number of problems, however. In particular, the size of the sensor is increased with respect to a sensor of the type described above. Indeed, in the example in FIG. 23, the "effective" transducer surface area for making a measurement is that of a circular annular strip approximately two times greater in width than that of the "effective" annular strip of a transducer of the type described with reference to FIG. 3A. Similarly, the "effective" target surface area for making a measurement is that of an annular strip approximately two times greater in width than that of the "effective" annular strip of the type described with reference to FIG. 3B. Furthermore, the embodiment of the primary is more complex than in the preceding embodiments if it is sought to excite in a relatively uniform manner each of the annular strips of scale N and N+1 of the sensor. In practice, it can be necessary to use three sets of separate turns to embody the primary excitation winding.

Figure 25:
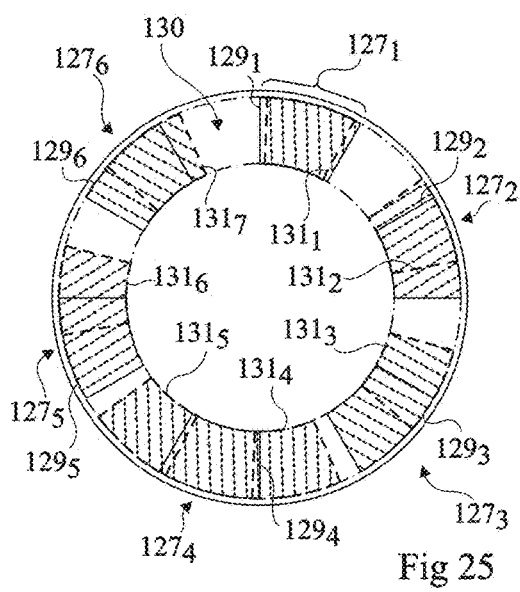
FIG. 25 is a front view schematically representing a target of an example of an embodiment of an inductive angular displacement sensor.

FIG. 25 is a front view schematically representing an example of an embodiment of an inductive displacement sensor. The sensor in FIG. 25 is a multi-pole sensor with two measurement scales N and N+1, operating according to the principle of a vernier as described with reference to FIGS. 23 and 24. In FIG. 25, only the target of the sensor has been shown.

The target of the sensor in FIG. 25 comprises a plurality of separated conductive patterns $127_i$, distributed along the 360° of a circular annular strip 130 of the target. As seen in FIG. 25, the set of patterns formed by the conductive patterns $127_i$ is not periodic. The various conductive patterns $127_i$ have the shape of angular sectors, of different angular apertures, of the annular strip 130 of the target, and are in principle irregularly distributed along the annular strip 130.

The set of patterns formed by the conductive patterns $127_i$ over the annular strip 130 of the target corresponds to the (virtual) overlay of the first and second sets of periodic conductive patterns of respective periodicities 360°/N and 360°/(N+1). The first set of patterns comprises N elementary patterns $129_j$ (solid lines) regularly distributed along the annular strip 130 of the target, each elementary pattern $129_j$ having the shape of a sector of the annular strip 130, of angular aperture approximately equal to 360°/2N. The second set of patterns comprises N+1 elementary patterns $131_k$ (dashed lines), regularly distributed along the annular strip 130, each elementary pattern $131_k$ having the shape of a sector of the annular strip 130, of angular aperture approximately equal to 360°/2(N+1). In other words, the surface areas of conductive patterns of the target in FIG. 25 correspond to the total or the combination of the surface areas of the conductive patterns of a first target of the type described with reference to FIG. 3B, of electrical period 360/N, and of a second similar target, having the same internal and external radii as the first target, but having an electrical period 360°/(N+1).

The transducer (not shown for the purpose of simplification) of the sensor in FIG. 25 is for example suitable for the conductive patterns of the target in a similar manner to that described with reference to the example in FIG. 23. In particular, it comprises for example:

at least one primary winding suitable for producing an approximately uniform magnetic excitation in a circular annular strip of the transducer substantially identical to the circular annular strip 130 of the target, intended to be positioned facing the annular strip 130 of the target;

at least first and second secondary windings of periodicity 360°/N, spatially offset by a fraction of an electrical period, extending along the circular annular strip of the transducer; and at least third and fourth secondary windings of periodicity 360°/(N+1), spatially offset by a fraction of an electrical period, extending along the same annular strip of the transducer.

The inventors observed that, although the conductive patterns of electrical period 360°/N and 360°/(N+1) of the target overlap and short-circuit one another, and consequently the target comprises conductive patterns $127_i$ irregularly distributed over a complete revolution of 360°, these patterns having residual angular apertures which may be different to the periodic angular apertures of the patterns of the sets of secondary windings of the transducer, the sensor in FIG. 25 is suitable for making, with very good performances, displacement measurements over the entire distance $D_{tot}$ (i.e. over a complete revolution) using a vernier type reading method similar or identical to the method described with reference to FIGS. 23 and 24.

One advantage of the sensor in FIG. 25 is that, due to the overlay of the patterns of respective electrical periods 360°/N and 360°/(N+1), the size of the sensor can be reduced with respect to a configuration of the type described with reference to FIG. 23. Furthermore, a single primary winding, for example of the type described with reference to FIG. 3A, suffices to generate a sufficiently uniform magnetic excitation for proper operation of the sensor.

Figure 26:
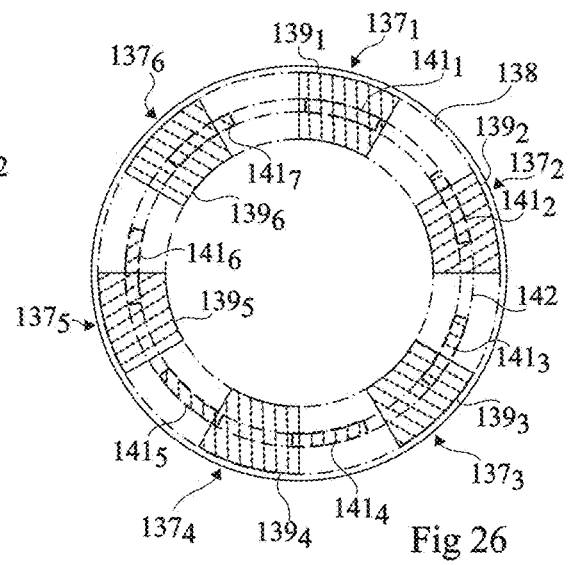
FIG. 26 is a front view schematically representing a target of an alternative embodiment of an inductive angular displacement sensor.

FIG. 26 is a front view schematically representing an alternative embodiment of the sensor in FIG. 25. In FIG. 26, only the target of the sensor has been shown.

The target of the sensor in FIG. 26 comprises a plurality of separated conductive patterns $137_i$, distributed along the 360° of a first circular annular strip 138 or wide strip of the target.

The set of patterns formed by the patterns $137_i$ on the annular strip 138 of the target corresponds to the overlay of the first and second sets of periodic patterns of respective electrical periods 360°/N and 360°/(N+1). The first set of patterns comprises N elementary conductive patterns $139_j$ (solid lines) regularly distributed along the first annular strip 138 of the target, each elementary pattern $139_j$ having the shape of a sector of the first annular strip 138 of the target, of angular aperture approximately equal to one electrical half-period 360°/2N. The second set of patterns comprises N+1 elementary patterns $141_k$ (dashed lines), regularly distributed along the second circular annular strip 142 or narrow strip of the target, concentric with the annular strip 138 and included in the annular strip 138, i.e. having an internal radius greater than the internal radius of the first annular strip, and/or an external radius less than the external radius of the annular strip 138. Each elementary pattern $141_k$ has the shape of an annular sector of the annular strip 142 of the target, of angular aperture approximately equal to 360°/2(N+1). The width (radial dimension) of the second annular strip 142 of the target is preferably markedly less than the (radial) width of the first annular strip 138 of the target, for example two to twenty times less than the width of the first annular strip (the wide strip).

The transducer (not shown for the purpose of simplification) of the sensor in FIG. 26 is for example suitable for the conductive patterns of the target in a similar manner to that described with reference to the examples in FIGS. 23 and 25. In particular, it comprises for example:

at least one primary winding suitable for producing an approximately uniform magnetic excitation in a first circular annular strip of the transducer (wide strip) substantially identical to the first annular strip 138 of the target, intended to be positioned facing the first annular strip of the target;

at least first and second secondary windings of periodicity 360°/N, spatially offset by a fraction of an electrical period, extending along the first circular annular strip of the transducer (the wide strip); and at least third and fourth secondary windings of periodicity 360°/(N+1), spatially offset by a fraction of an electrical period, arranged along a second circular annular strip of the transducer (narrow strip), substantially identical to the second annular strip 142 of the target and intended to be positioned facing the annular strip 142 of the target.

The operation of the sensor in FIG. 26 is similar to that of the sensor in FIG. 25. Preferably, in the sensor in FIG. 26, the secondary winding(s) making the "refined" measurement as described above, are windings wherein the turns have the shape of annular sectors of the widest annular strip of the transducer (substantially identical to the annular strip 138 of the target). By the concept of refined measurement, it is understood that priority is given to design work to provide the measurement made by the secondaries of the wide strip with performance and robustness, optionally and to a certain degree, at the expense of the performance and robustness of the measurement made by the secondaries of the narrow strip.

An additional advantage of the sensor in FIG. 26 with respect to the sensor in FIG. 25 is that it is more robust to positioning errors between the target and the transducer than the sensor in FIG. 25. In particular, the measurement obtained at the terminals of the secondary windings of the wide strip (preferably associated with the refined measurement) is more robust to positioning errors between the target and the transducer than the sensor in FIG. 25. Indeed, in the sensor in FIG. 26, reducing the surface area of one of the measurement scales with respect to the other makes it possible reduce to a certain degree, the coupling created by the patterns of the narrow strip on the patterns of the wide strip at the target, particularly with respect to the target in FIG. 25 for which the mutual influence of one set of patterns on the other is substantially equivalent and very strong. It is thereby possible to increase the robustness of one of the sets of secondaries to positioning errors.

It should be noted that, in the example shown, the mean radius of the second circular annular strip of the sensor (the narrow strip) is approximately equal to the mean radius of the first circular annular strip of the target (the wide strip). This configuration is advantageous as it makes it possible to remove in a substantially equivalent manner the effects of the internal and external ortho-radial portions of the conductive patterns. The embodiments described are however not restricted to this particular configuration.

Figure 27A:
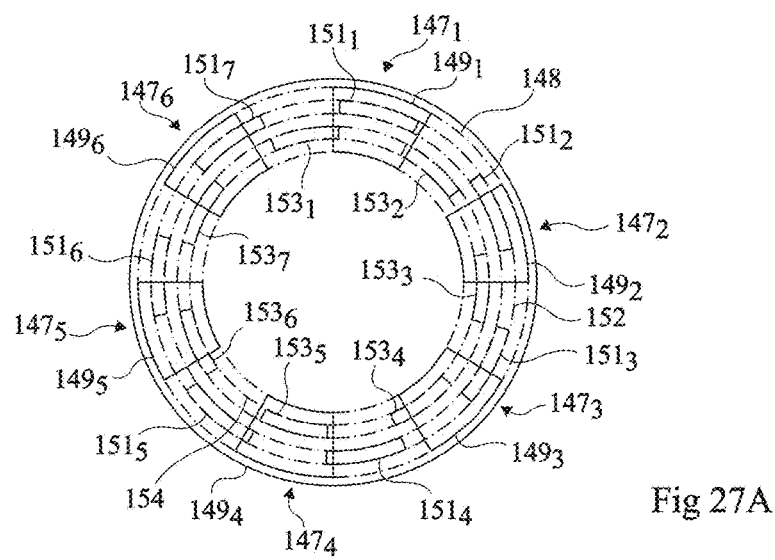
FIGS. 27A to 27C are front views schematically representing a further alternative embodiment of an inductive angular displacement sensor.
Figure 27B:
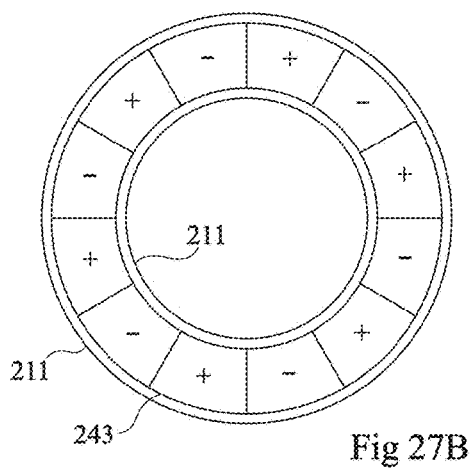
Figure 27C:
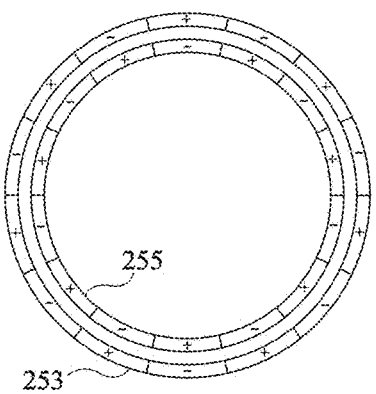

FIGS. 27A to 27C are front views schematically representing a further alternative embodiment of the sensor in FIG. 25. More particularly, FIG. 27A is a front view of the target, FIG. 27B is a front view of a portion of the transducer, and FIG. 27C is a front view of a further portion of the transducer. In practice, the two portions of the transducer represented separately in FIGS. 27B and 27C for illustration purposes, are rigidly connected and overlaid concentrically in a single transducer, without the breakdown of the constituent elements of said transducer in these two figures foreseeing a particular distribution over a plurality of metallization levels.

The target of the sensor in FIGS. 27A to 27C comprises a plurality of separated conductive patterns $147_i$, distributed along the 360° of a first circular annular strip 148 or wide strip of the target.

The set of patterns formed by the conductive patterns $147_i$ on the first annular strip 148 corresponds to the overlay of a first set of periodic patterns of electrical period 360°/N, and of second and third sets of periodic patterns of electrical periods 360°/(N+1). The first set of patterns comprises N elementary conductive patterns $149_j$ (solid lines) regularly distributed along the annular strip 148 of the target (wide strip), each elementary pattern $149_j$ having the shape of a sector of the strip 148, of angular aperture approximately equal to 360°/2N. The second set of patterns comprises N+1 elementary conductive patterns $151_k$ (dashed lines), regularly distributed along a second annular strip 152 of the target (narrow strip), concentric with the first annular strip 148 and included in the strip 148, i.e. having an internal radius greater than the internal radius of the annular strip 148, and an external radius less than the external radius of the annular strip 148. In this example, the internal radius of the annular strip 152 of the target is greater than the mean radius of the first annular strip 148. This example of an embodiment is in no way restrictive, and in particular the narrow strips 152 and 154 can be arranged differentially in the wide strip 148, without the mean radius of the wide strip 148 representing an impassable limit for either of the narrow strips. Each elementary pattern $151_k$ has the shape of a second of the second annular strip 152 of the target, of angular aperture approximately equal to 360°/2(N+1). The (radial) width of the annular strip 152 of the target is preferably low with respect to the width of the annular strip 148 of the target, for example three to twenty times less than the width of the first strip. The third set of patterns comprises N+1 elementary conductive patterns $153_k$ (dashed lines), regularly distributed along a third annular strip 154 of the target (narrow strip), concentric with the annular strip 148 and included in the annular strip 148. In this example, the external radius of the annular strip 154 of the target is less than the mean radius of the annular strip 148. The difference between the mean radius of the first annular strip 148 and the mean radius of the third annular strip 154 is for example approximately equal to the difference between the mean radius of the second annular strip 152 and the mean radius of the first annular strip 148. Each elementary pattern $153_k$ has the shape of a sector of the third annular strip 154 of the target, of angular aperture approximately equal to 360°/2(N+1). The width of the third annular strip is for example approximately equal to the width of the second annular strip.

Alternatively, the width of the third annular strip 154 is such that the surface area of a pattern of the annular strip 154 is approximately equal to the surface area of a pattern of the annular strip 152. These two examples of embodiments are in no way restrictive.

As seen in FIG. 27A, the periodic patterns of periodicity 360°/(N+1) of the annular strip 154 of the target are spatially offset by 360°/2(N+1) with respect to the periodic patterns of periodicity 360°/(N+1) of the annular strip 152 of the target. As such, in the "empty" angular ranges of angular aperture 360°/(N+1) separating two adjacent elementary conductive elements $151_k$, extends approximately an elementary pattern $153_k$, and, in the "empty" angular ranges of angular aperture 360°/(N+1) separating two adjacent elementary conductive patterns $153_k$, extends approximately an elementary conductive pattern $151_k$. In other words, substantially all the radial directions of the target encounter an elementary conductive pattern $151_k$ or an elementary pattern $153_k$.

The transducer of the sensor in FIGS. 27A to 27C is for example suitable for the conductive patterns of the target in a similar manner to that described with reference to the examples in FIGS. 23, 25 et 26. It comprises for example:

at least one primary winding 211 (FIG. 27B) suitable for producing an approximately uniform magnetic excitation in a first circular annular strip of the transducer substantially identical to the first annular strip 148 of the target, intended to be positioned facing the annular strip 148 of the target;

at least first and second secondary windings 243 (only one secondary winding 243 has been shown in FIG. 27B) of electrical period 360°/N, each comprising N turns of the same winding direction or, alternatively, 2N turns of alternating winding directions, each turn of the first and secondary windings having the shape of a sector of angular aperture 360°/2N of the first annular strip of the transducer, and the N or 2N turns of each winding being regularly distributed along the 360° of the first annular strip of the transducer;

at least third and fourth secondary windings 253 (only one secondary winding 253 has been shown in FIG. 27C) of periodicity 360/(N+1), each comprising N+1 turns of the same winding direction or, preferably, 2(N+1) turns of alternating winding direction, each turn of the third and fourth secondary windings having the shape of a sector of angular aperture 360°/2(N+1) of a second annular strip of the transducer, substantially identical to the second annular strip 152 of the target and intended to be positioned facing the strip 152 of the target, the N+1 or 2(N+1) turns of each winding being regularly distributed along the 360° of the second annular strip of the transducer; and at least fifth and sixth secondary windings 255 (only one secondary winding 255 has been shown in FIG. 27C) of periodicity 360°/(N+1), each comprising N+1 turns of the same winding direction or, preferably, 2(N+1) turns of alternating winding directions, each turn of the fifth and sixth secondary windings having the shape of a sector of angular aperture 360°/2(N+1) of a third annular strip of the transducer, substantially identical to the third annular strip 154 of the target and intended to be positioned facing the annular strip 154 of the target, the N+1 or 2(N+1) turns of each winding being regularly distributed along the 360° of the third annular strip of the transducer.

The third and fifth secondary windings are of opposite polarities, i.e. they are spatially offset by 360°/2(N+1) according to the polarity convention (represented by a + or − sign) defined in FIG. 7 and adopted hereinafter in the description. The fourth and sixth windings are arranged with respect to one another according to a substantially identical arrangement to the arrangement between the third and fifth secondary windings.

Preferably, in the first circular annular strip, the first and second secondary windings are spatially offset by 360°/2N with respect to one another, in the second circular annular strip, the third and fourth secondary windings are spatially offset by 360°/2(N+1) with respect to one another, and, in the third circular annular strip, the fifth and sixth secondary windings are offset by 360°/2(N+1) with respect to one another.

More generally, the transducer can comprise, in the first annular strip, a plurality of secondary windings of electrical period $D_{tot}/N$, substantially identical to the first secondary winding and spatially offset with respect to one another by a fraction of an electrical period; in the second annular strip, a plurality of secondary windings of electrical period $D_{tot}/(N+1)$, substantially identical to the third secondary winding and spatially offset with respect to one another by a fraction of an electrical period; and in the third annular strip, a plurality of secondary windings of electrical period $D_{tot}/(N+1)$, substantially identical to the fifth secondary winding and spatially offset with respect to one another by a fraction of an electrical period.

The operation of the sensor in FIGS. 27A to 27C is similar to that of the sensor in FIGS. 25 and 26.

Various reading configurations can be used in the example in FIGS. 27A to 27C. The inventors particularly observed that:

reading of the set of patterns $147_i$ by a secondary winding 243 generates a wanted signal suitable for processing, of electrical period 360°/2N;

reading of the set of patterns $147_i$ by a secondary winding 253 generates a wanted signal suitable for processing, of electrical period 360°/2(N+1);

reading of the set of patterns $147_i$ by a secondary winding 255 generates a wanted signal suitable for processing, of electrical period 360°/2(N+1);

a combination of the simultaneous readings of the set of patterns $147_i$ by a secondary winding 253 and by a secondary winding 255, for example when both secondaries are of alternating polarities (as illustrated by FIG. 27C) and electrically connected in series, generates a wanted signal suitable for processing, of electrical period 360°/2(N+1) and of amplitude approximately equal to double the wanted signal read by the secondary winding 253 or of the wanted signal read by the secondary winding 255;

reading of the set of patterns $147_i$ by a secondary winding 243 generates a relatively weak parasitic signal (particularly of periodicities 360°/(N+1) and 360°) with respect to the wanted signal detected by this secondary winding;

a combination of the simultaneous readings of the set of patterns $147_i$ by a secondary winding 253 and by a secondary winding 255, for example when two secondaries are of alternating polarities (as illustrated by FIG. 27C) and electrically connected in series, generates a relatively weak parasitic signal (particularly of periodicities 360°/N and 360°) with respect to the wanted signal detected by this secondary winding.

An additional advantage of the sensor in FIGS. 27A to 27C is that it is even more robust to positioning errors between the target and the transducer as the sensor in FIG. 26.

In particular, the measurement obtained at the terminals of the secondary windings 243 of the wide strip (preferably associated with the refined measurement) is more robust to positioning errors between the target and the transducer than in the sensor in FIG. 26. Indeed, in the sensor in FIGS. 27A to 27C, substantially all the radial directions of the target encounter a single elementary conductive pattern of a narrow strip, arranged on either of the two narrow strips of the target. Furthermore, the two narrow strips of the target are preferably arranged at a sufficient distance from the two internal and external ortho-radial branches of the secondaries 243 of the wide strip of the transducer. Under these conditions, the coupling of the conductive patterns of the two narrow strips of the target on the measurement at the terminals of the secondaries 243 of the wide strip results from the combination of the induction of the conductive patterns of a narrow strip of the target, these two contributions compensating each other substantially regardless of the position of the target with respect to the transducer. The parasitic coupling then adopts a relatively stable value when the position of the target with respect to the transducer changes. Furthermore, the coupling adopts a substantially zero value when the secondaries of the wide strip comprise 2N turns of alternating winding directions, as described for the sensor in FIG. 3 for example, in order to make a spatially differential measurement. A further formulation consists of considering that the secondaries of the wide strip of the transducer "see" roughly the two offset narrow strips as a single narrow median conductive strip and substantially solid or continuous over $D_{tot}$ in electromagnetic terms (and not electrically), and that this virtual strip as such induces a substantially position-independent signal at the terminals of said secondaries.

Moreover, the inventors observed that the measurement obtained at the terminals of the secondary winding 253 (of a narrow strip) exhibit a behavior according to the position of the target with respect to the transducer which is similar to the behavior according to the position of the measurement obtained at the terminals of the secondary winding 255 (of the other narrow strip). The inventors also observed that, in the event of positioning defects of the target with respect to the transducer, the behavior according to the position of the measurement at the terminals of one of the two windings 253 or 255 of one of the two narrow strips, exhibits deformations relatively complementary with the deformations obtained on the measurement at the terminals of the other winding. As such, by combining the measurements of the two secondaries of the two narrow strips, and preferentially connecting the two windings in series if they are designed so as to exhibit a relatively similar behavior in respect of position in terms of amplitude and linearity in particular, it is possible to obtain a measurement at the terminals of the new composite winding which is relatively robust to positioning defects. Indeed, in the sensor in FIGS. 27A to 27C, substantially all the radial directions of the transducer encounter exactly two elementary turns of the composite winding, of opposite polarity and alternately arranged on each of the two narrow strips of the transducer. Furthermore, the two narrow strips of the transducer are at a sufficient distance from the two internal and external ortho-radial branches of the conductive patterns of the wide strip of the target. Under these conditions, the coupling of the conductive patterns $149_j$ of the wide strip of the target on the measurement at the terminals of the composite winding results from the combination of the induction of the conductive patterns $149_j$ on the secondary 253 (one narrow strip) and from the induction of the conductive patterns $149_j$ on the secondary 255 (the other narrow strip), these two contributions compensating each other substantially regardless of the position of the target with respect to the transducer. The parasitic coupling then adopts a relatively stable value when the position of the target with respect to the transducer changes. Furthermore, the coupling adopts a substantially zero value when the secondaries 253 and 255 (narrow strips) comprise 2(N+1) turns of alternating winding directions, as described for the sensor in FIG. 3 for example, in order to make a spatially differential measurement. A further formulation consists of considering that, when the position of the target with respect to the transducer changes, the reading made by a secondary of the narrow strip of the transducer of the set of conductive patterns associated therewith on the target is substantially "in phase" with the reading made by the secondary of the other narrow strip of the transducer of the set of conductive patterns associated therewith on the target. Moreover and when the position of the target with respect to the transducer changes, the reading made by a secondary of the narrow strip of the transducer of the set of conductive patterns $149_j$ of the wide strip is substantially "in phase opposition" with the reading made by the secondary of the other narrow strip of the transducer of the same set of conductive patterns of the wide strip of the target. As such, when the two measurements are added by mathematical or electrical means (for example by a serial electrical connection), the parasitic coupling adopts a substantially zero value when the secondaries of each narrow strip are designed for this purpose, whereas the wanted signal is retained and/or amplified.

It should be noted that, in the case of the serial electrical connection of the secondary winding of a narrow strip with the secondary winding of the other narrow strip, and so as to obtain the features of the sensors described with reference to FIG. 2E, it is for example possible to select as the midpoint of the composite winding, the serial connection point of the two elementary windings.

It should be noted that further methods for combining the measurements of the two secondaries of the narrow strip can be envisaged, such as linear combinations of the signals conditioned separately, or further methods for electrically interconnecting the secondaries, with for example the same aim of increasing the robustness of the measurements at the wide strip and/or the narrow strips of the transducer, to positioning defects of the target with respect to the transducer.

It should be noted that in the examples shown in FIGS. 23, 25, 26 and 27A, one of the elementary patterns of electrical period 360°/(N+1) is approximately centered on the same angular position as one of the elementary patterns of electrical period 360°/N. For example, in FIG. 25, the pattern $131_1$ is centered on the same angular position as the pattern $129_1$, and in FIG. 27A, the pattern $151_1$ is centered on the same angular position as the pattern $149_1$. This configuration is preferential as it helps increase the overall level of symmetry of the sensor, which particularly makes it possible to facilitate the manufacture and visual inspection of the target, or facilitate the design and manufacture of the sets of secondary windings. The embodiments described are however not restricted to this particular case.

As a general rule, it should be noted that the embodiments described above can be adapted to two signals $\theta_{N1}$ and $\theta_{N2}$, N1 and N2 being different integers but the difference thereof not necessarily being unitary. Under these conditions, a sensor characterized by N1 and N2=N1+2 and of a similar arrangement to the arrangement of the sensors in FIGS. 23, 25, 26 and 27A to 27C, makes it possible to extend the absolute measurement over a range $D_{tot}/N=180°$. As a more general rule, a sensor characterized by N1 and N2=N1+r, where r is a positive integer, different to zero and strictly less than N1 (in other words, less than or equal to N1−1), makes it possible under certain conditions to extend the absolute measurement over a range $D_{tot}/r=360°/r$.

Furthermore, alternatively in the examples in FIGS. 26 and 27A to 27C, instead of reducing the width of the patterns of periodicity 360°/(N+1) with respect to the width of the patterns of periodicity 360°/N, it could be envisaged to reduce the width of the patterns of periodicity 360°/N with respect to the width of the patterns of periodicity 360°/2(N+1).

Furthermore, it should be noted that the number of pole pairs is preferably even for the patterns of the wide strip, so as to benefit from increased symmetry of the transducer on either side of the midpoint (particularly when the transducer is embodied according to the second aspect).

Moreover, it should be noted that the embodiments described with reference to FIGS. 23 to 27C do not merely be applied to planar angular displacement sensors, but can be applied to further types of inductive displacement sensors, and particularly planar linear displacement sensors, or non-planar angular displacement sensors, for example linear displacement sensors "wound" (for example shaped according to a cylinder) about and facing a part in rotation whereon on a target also of the linear type and "wound" (for example shaped according to a cylinder). These two examples of embodiments are in no way restrictive.

Fourth Aspect

Generally, the target of an inductive displacement sensor consists of a metal plate cut over the entire thickness therefore so as to retain, facing the windings of the transducer, only portions of the plate corresponding to the conductive patterns of the target, as shown for example in FIG. 50 of the patent EP0182085 mentioned above. Alternatively, the target can consist of a dielectric substrate, for example a plastic plate, wherein one face oriented toward the transducer is partially coated with a metal layer forming the conductive pattern(s) of the target.

The targets of the type mentioned above have however points of weakness, which can pose problems in some applications, particularly applications wherein the movable parts for which it is sought to be able to detect the displacement are liable to be subjected to significant shocks or vibrations. Of these points of weakness, the inventors particularly identified the conductive patterns when they are relatively fine and/or angular, and the dielectric substrate which is generally soft (PCB epoxy, plastic, etc.). Furthermore, the embodiment of a firm attachment between the target and a movable part for which it is sought to be able to detect the displacement can pose difficulties. This attachment (for example by bonding, screwing, fitting, etc.) can particularly represent a point of mechanical weakness. Such points of weakness restrict the industrial applications of sensors equipped with such targets, and particularly require either instrumentation of the rotary mechanical part after the assembly operations of said part particularly when these assembly operations are performed using force tools such as mallets and presses, or protection of the target and/or the transducer in a solid mechanical housing. This is for example the case of instrumented bearings which are embedded with high-tonnage press means.

According to a fourth aspect, it would be desirable to be able to avail of an inductive displacement sensor target remedying all or part of the drawbacks of existing targets, particularly in terms of strength.

For this, according to a fourth embodiment, it is envisaged to embody an inductive displacement sensor target, formed from one conductive metal piece (for example a piece of steel), or one-piece target, machined such that the face of the target intended to be oriented towards the transducer comprises one or a plurality of metal studs projecting from a base metal wall. The stud (s) of the target correspond to the conductive pattern or to the conductive patterns of the target, and the portions of the base wall not topped with a stud correspond to conductive pattern-free zones of the target, i.e. zones usually non-conductive in conventional inductive displacement sensor targets.

Figure 28:
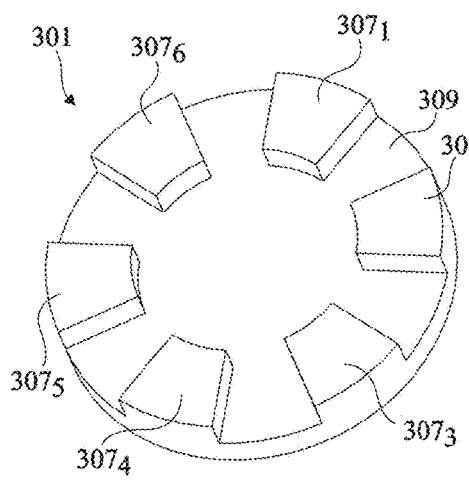
FIG. 28 is a perspective view representing an example of an embodiment of an inductive angular displacement sensor target.

FIG. 28 is a perspective view representing an example of an embodiment of such a one-piece target 301, for an inductive displacement sensor. The target 301 has the general shape of a metal disk, machined such that one face of the disk intended to be oriented towards the transducer comprises N conductive studs $307_i$ (N=6 in the example shown) substantially of the same height, projecting from an approximately planar base wall 309. Each stud $307_i$ has a vertex or a top face, approximately planar and parallel with the wall 309. Furthermore, in this example, the side walls of the studs are approximately orthogonal to the wall 309. The top faces of the studs $307_i$ of the target 301 define the conductive patterns of the target. In this example, the target 301 has a conductive pattern substantially identical to that of the target in FIG. 3B, i.e., in projection along an orthogonal direction to the median plane of the disk, the studs $307_i$ have substantially the same shape and are arranged substantially in the same way as the conductive patterns $117_i$ of the target in FIG. 3B.

The operating principle of the target 301 is similar to that described above, i.e. when the target is placed in front of a transducer emitting a magnetic excitation, induction phenomena, for example eddy currents, arise in the studs $307_i$, particularly at the top face of the studs, inducing a variation of an output signal level of the transducer according to the position of the studs $307_i$ with respect to the transducer.

It should be noted that in the target 301, the portions of the surface of the target facing the transducer situated between the studs $307_i$ are conductive. Consequently, under the effect of the magnetic excitation generated by the primary winding, induction phenomena, for example eddy currents, can also arise in these portions of the target, at the base wall 309. As a more general rule, and for example in the case of the sensor in FIG. 28 where the studs are in uniform electrical contact with the substrate of the target characterized by the wall 309, the electromagnetic field distributions results from the overall interaction of the conductive structure of the target with the magnetic excitation generated by the primary. In particular, there are electromagnetic phenomena associated with the overall conductive structure of the target rather than that of each conductive stud, for example the flow of an induced current substantially along a loop concentric with the axis of rotation of the target, rather than along local loops substantially defined by the surfaces of the contracts $307_i$ or by the portions of surface of the wall 309 which are contained between the studs. It should be noted in particular that in the prior art, it is conventional to remove the base wall 309 as much as possible and electrically insulate the studs $307_i$ so as to avoid these parasitic induction phenomena.

However, the distance between the transducer and the wall 309 being greater than the distance between the transducer and the studs $307_i$, the induction phenomena arising in the wall 309 are less than the induction phenomena arising at the surface of the studs $307_i$. The tests conducted by the inventors demonstrated that the inductive contribution of the wall 309 can optionally cause a modification such as an attenuation or a modification of the linearity characteristics of the wanted output signal of the transducer when the height of studs $307_i$ is low, but, on the other hand, it does not degrade the precision of the position measurement which can be made by the sensor.

It should be noted that according to the first aspect, described in particular with reference to FIGS. 12A to 12D, it is possible to envisage, with geometric adjustments of the target and in particular with the adjustment of the height of the studs $307_i$ in the sensor in FIG. 28, adjusting the optimal target-transducer distance $d_{opt}$ in terms of linearity. As such, the height of the studs can be chosen such that the distance $d_{opt}$ is compatible with the target application, for example between 0.5 and 1.5 mm, which is a range of values compatible with various industrial applications.

By way of non-restrictive example, the height of the studs $307_i$ is between 0.1 and 30 mm and preferably between 1 and 10 mm.

More generally, any type of inductive displacement sensor target with one or a plurality of conductive patterns can be embodied in one-piece form, as described with reference to FIG. 28, for example inductive linear displacement targets, or planar inductive angular displacement sensor targets having different conductive patterns from that in FIG. 28, i.e. for example different from angular sectors or rectangles, and for example characterized in that at least one of the contours thereof (for example the external contour) develops substantially like a spiral according to the angle on the target, or in that at least one of the contours thereof develops substantially sinusoidally according to the angle on the target.

Figure 29:
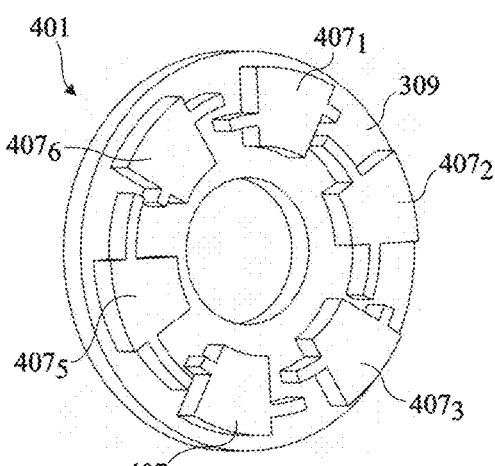
FIG. 29 is a perspective view representing a further example of an embodiment of an inductive angular displacement sensor target.

By way of illustration, a further non-restrictive example of a one-piece planar inductive angular displacement sensor target 401 is shown in FIG. 29.

As in the example in FIG. 28, the target 401 has the general shape of a metal disk, machined such that one face of the disk intended to be oriented towards the transducer comprises conductive studs 407 substantially of the same height, projecting from an approximately planar base wall 309. As above, each stud 407 has a vertex or a top face, approximately planar and parallel with the wall 309, and the side walls of the studs are approximately orthogonal to the wall 309. The top faces of the studs 407 of the target 401 define the conductive patterns of the target. In this example, the target 401 has conductive patterns substantially identical to those of the target in FIG. 27A, i.e., viewed from above, the studs 407 have substantially the same shape and are arranged substantially in the same way as the conductive patterns $147_i$ of the target in FIG. 27A.

The embodiment of one-piece targets of the type mentioned above can be performed by any known means for machining a solid metal part, for example by etching, by sintering, by molding, by embossing, etc.

One advantage of the one-piece targets of the type mentioned above is that they are particularly robust with respect to existing targets, and can as such be handled without special precautions. This robustness particularly stems from the fact that such targets are solid and have no apparent points of weakness. Furthermore, these targets are easier to attach firmly to movable parts than existing targets. In particular, any metal-on-metal force-fitting and/or metal-metal welding techniques can be used. These two features make it possible to pre-instrument a very large majority of rotary metal parts even before the assembly thereof or use in the host system. To finalize the instrumentation of the system, it is simply necessary to mount the transducer opposite the assembled target, either at the end of assembly or at any stage of the life-cycle of the host system.

According to one particularly advantageous embodiment, a one-piece inductive displacement sensor target of the type described above can be machined directly in a metal part for which it is sought to be able to detect the position (and/or the displacement), for example:

for an angular measurement, a motor vehicle steering column, an engine shaft or a reduction gearbox (for example at one disk-shaped face of an end section of the shaft), a rotary ring (internal or external) of a ball bearing, a gear, etc.; or for a linear measurement, a piston rod, a shock absorber body, etc.

Various examples and embodiment with various alternative embodiments have been described above. It should be noted that those skilled in the art will be able to combine various elements of these various examples, embodiments and alternative embodiments without exercising inventive skill. It should be noted in particular that the first, second, third and fourth embodiments described above can be implemented independently of one another or combined fully or in part according to the needs of the application.

The invention claimed is:

1. A target for an inductive displacement sensor, the target comprising:
a plurality of separated conductive patterns distributed along a zone having a dimension $D_{tot}$ in a direction of a first circular annular strip or a wide strip of the target, said patterns being defined by an overlay of at least
a first set of elementary periodic patterns having a period approximately equal to $D_{tot}/N$, including N first elementary conductive patterns of a dimension approximately equal to $D_{tot}/2N$ in said direction, regularly distributed along the first circular annular strip of the target, each of the first elementary conductive patterns having the shape of a sector of the first circular annular strip of the target, and
a second set of elementary periodic patterns having a period approximately equal to $D_{tot}/(N+r)$, including N+r second elementary patterns of a dimension approximately equal to $D_{tot}/2(N+r)$ in said direction, regularly distributed along a second circular annular strip or narrow strip of the target, concentric with the first circular annular strip and included in the first circular annular strip, each of the second elementary patterns having the shape of an annular sector of the second circular annular strip of the target, where N is an integer greater than or equal to 2 and r is a positive integer, different to zero and less than or equal to N−1,
wherein first and second elementary conductive patterns overlap at least partially.

2. The target for the inductive displacement sensor according to claim 1, wherein the first and second elementary conductive patterns have respectively the shape of portions of overlaid first and second strips parallel with said direction.

3. The target for the inductive displacement sensor according to claim 2, wherein the first and second strips are of separate widths, the first strip being at least two times wider than the second strip.

4. The target for the inductive displacement sensor according to claim 1, wherein N is an even number.

5. The target for the inductive displacement sensor according to claim 1, wherein said patterns are defined by the overlay of the first and second sets of periodic elementary patterns, and of a third set of periodic elementary patterns having a period approximately equal to $D_{tot}/(N+r)$, comprising N+r third elementary patterns of a dimension approximately equal to $D_{tot}/2(N+r)$ in said direction, regularly distributed along said zone with an offset of approximately $D_{tot}/2(N+r)$ with respect to the elementary patterns of the second set of periodic patterns, first and third elementary conductive patterns overlapping at least partially.

6. The target for the inductive displacement sensor according to claim 5, wherein the first, second and third elementary patterns have respectively the shape of portions of first, second and third strips parallel with said direction, both the first and second strips, and the first and third strips, being overlaid, and the second and third strips being approximately of the same width less than the width of the first strip.

7. The target for the inductive displacement sensor according to claim 1, wherein said direction is a circular direction.

8. The target for the inductive displacement sensor according to claim 7, wherein said dimension $D_{tot}$ is an angular dimension equal to 360°.

9. The target for the inductive displacement sensor according to claim 1, wherein r is equal to 1.

10. A transducer for an inductive displacement sensor, the transducer comprising:
a primary winding producing a uniform magnetic excitation in a first circular annular strip of the transducer identical to a first circular annular strip of a target, facing the first circular annular strip of the target;
a first set of at least two secondary windings each comprising N first turns of the same winding direction or 2N first turns of alternating winding directions, regularly distributed along a zone having a dimension $D_{tot}$ in a direction, each first turn having a dimension in said direction approximately equal to $D_{tot}/2N$ of the first circular annular strip of the transducer, and the N or 2N first turns of each winding being regularly distributed along the first circular annular strip of the transducer; and
a second set of at least two secondary windings each comprising N+r second turns of the same winding direction or 2(N+r) second turns of alternating winding directions, regularly distributed along said zone, each second turn having a dimension in said direction approximately equal to $D_{tot}/2(N+r)$ of a second circular annular strip of the transducer, identical to a second circular annular strip of the target and facing the second circular annular strip of the target, where N is an integer greater than or equal to 2 and r is a positive integer, different to zero and less than or equal to N−1,
wherein first and second turns overlap at least partially.

11. The transducer for the inductive displacement sensor according to claim 10, wherein the first and second turns have respectively the shape of portions of overlaid first and second strips parallel with said direction.

12. The transducer for the inductive displacement sensor according to claim 10, further comprising a third set of at least two secondary windings each comprising N+r third turns of the same winding directions or 2(N+r) turns of alternating winding directions, regularly distributed along said zone with an offset of approximately $D_{tot}/2(N+r)$ with respect to the second set, each third turn having a dimension approximately equal to $D_{tot}/2(N+r)$ in said direction, and first and second turns overlapping at least partially.

13. The transducer for the inductive displacement sensor according to claim 12, wherein the first, second and third turns have respectively the shape of portions of first, second and third strips parallel with said direction, the first and second strips being overlaid and the first and third strips being overlaid.

14. The transducer for the inductive displacement sensor according to claim 12, wherein the second and third secondary windings are connected in series.

15. The transducer for the inductive displacement sensor according to claim 14, wherein a serial connection point of the second and third secondary windings is connected to an electrical connection terminal.

16. An inductive displacement sensor comprising:
a target, the target comprising
a plurality of separated conductive patterns distributed along a zone having a dimension $D_{tot}$ in a direction of a first circular annular strip or wide strip of the target, said patterns being defined by an overlay of at least
a first set of elementary periodic patterns having a period approximately equal to $D_{tot}/N$, including N first elementary conductive patterns of a dimension approximately equal to $D_{tot}/2N$ in said direction, regularly distributed along the first circular annular strip of the target, each of the first elementary periodic patterns having the shape of a sector of the first circular annular strip of the target, and
a second set of elementary periodic patterns having a period approximately equal to $D_{tot}/(N+r)$, including N+r second elementary patterns of a dimension approximately equal to $D_{tot}/2(N+r)$ in said direction, regularly distributed along a second circular annular strip or narrow strip of the target, concentric with the first circular annular strip and included in the first circular annular strip, each of the second elementary patterns having the shape of an annular sector of the second circular annular strip of the target, where N is an integer greater than or equal to 2 and r is a positive integer, different to zero and less than or equal to N−1; and
a transducer comprising
a primary winding producing a uniform magnetic excitation in a first circular annular strip of the transducer identical to the first circular annular strip of the target, facing the first circular annular strip of the target,
a first set of at least two secondary windings each comprising N first turns of the same winding direction or 2N first turns of alternating winding directions, regularly distributed along the zone having the dimension $D_{tot}$ in the direction of the first circular annular strip or the wide strip of the target, each first turn having a dimension in said direction approximately equal to $D_{tot}/2N$ of the first circular annular strip of the transducer, and the N or 2N first turns of each winding being regularly distributed along the first circular annular strip of the transducer, and
a second set of at least two secondary windings each comprising N+r second turns of the same winding direction or 2(N+r) second turns of alternating winding directions, regularly distributed along said zone, each second turn having a dimension in said direction approximately equal to $D_{tot}/2(N+r)$ of a second circular annular strip of the transducer, identical to the second circular annular strip of the target and facing the second circular annular strip of the target, where N is an integer greater than or equal to 2 and r is a positive integer, different to zero and less than or equal to N−1, wherein first and second turns overlap at least partially, and wherein first and second elementary conductive patterns overlap at least partially.

* * * * *